US011546116B2

(12) United States Patent
Jiang et al.

(10) Patent No.: US 11,546,116 B2
(45) Date of Patent: Jan. 3, 2023

(54) DATA TRANSMISSION METHOD AND COMMUNICATIONS APPARATUS

(71) Applicant: HUAWEI TECHNOLOGIES CO., LTD., Guangdong (CN)

(72) Inventors: Chenggang Jiang, Chengdu (CN); Xingxin Zhang, Chengdu (CN); Jiu Yin, Chengdu (CN); Xuehuan Wang, Chengdu (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 262 days.

(21) Appl. No.: 17/104,638

(22) Filed: Nov. 25, 2020

(65) Prior Publication Data

US 2021/0083831 A1 Mar. 18, 2021

Related U.S. Application Data

(63) Continuation of application No. PCT/CN2019/088509, filed on May 27, 2019.

(30) Foreign Application Priority Data

May 31, 2018 (CN) .......................... 201810556494.X

(51) Int. Cl.
*H04W 72/04* (2009.01)
*H04L 5/00* (2006.01)
*H04B 7/06* (2006.01)

(52) U.S. Cl.
CPC .......... *H04L 5/0053* (2013.01); *H04B 7/0626* (2013.01); *H04W 72/0413* (2013.01); *H04W 72/0446* (2013.01)

(58) Field of Classification Search
CPC ...................... H04W 72/0446; H04W 72/0413
(Continued)

(56) References Cited

U.S. PATENT DOCUMENTS

| 2012/0099664 | A1 | 4/2012 | Cheong et al. |
| 2012/0177017 | A1 | 7/2012 | Gong et al. |
| 2016/0127228 | A1 | 5/2016 | Liu et al. |
| 2016/0157266 | A1 | 6/2016 | Wang et al. |

(Continued)

FOREIGN PATENT DOCUMENTS

| CN | 101179778 A | 5/2008 |
| CN | 104507108 A | 4/2015 |

(Continued)

OTHER PUBLICATIONS

Huawei, HiSilicon, High level consideration on NR unlicensed band operation. 3GPP TSG RAN WG1 Meeting #92, Athens, Greece, Feb. 26 Mar. 2, 2018, R1-1802722, 4 pages.

(Continued)

*Primary Examiner* — Angel T Brockman
(74) *Attorney, Agent, or Firm* — Womble Bond Dickinson (US) LLP

(57) ABSTRACT

Embodiments of this application disclose a data transmission method and a communications apparatus. A method in an embodiment includes: sending, by a network device, first data to a terminal in a first subframe through a first channel, where the first channel is a channel occupied in a channel system by a service between the network device and the terminal; performing, by the network device, channel listening on a channel that is not occupied in the channel system by the service; and when there is a second channel in an idle state, sending, by the network device, second data of the service to the terminal in a second subframe through the first channel and the second channel, where the second subframe is after the first subframe. The service includes the first data and the second data, and a data frame of the service includes the first subframe and the second subframe.

20 Claims, 12 Drawing Sheets

(58) Field of Classification Search
USPC .......................................................... 370/329
See application file for complete search history.

(56) References Cited

U.S. PATENT DOCUMENTS

2016/0174109 A1* 6/2016 Yerramalli ........ H04W 72/0446
370/329
2017/0230973 A1 8/2017 Noh et al.

FOREIGN PATENT DOCUMENTS

| CN | 107079414 A | 8/2017 |
|---|---|---|
| CN | 107770872 A | 3/2018 |
| CN | 108028730 A | 5/2018 |
| WO | 2016010684 A1 | 1/2016 |
| WO | 2016048798 A1 | 3/2016 |
| WO | 2017030603 A1 | 2/2017 |
| WO | 2017199205 A1 | 11/2017 |

OTHER PUBLICATIONS

Apple Inc., Channel Access Procedures for NR-U. 3GPP TSG RAN WG1 Meeting #95, Spokane, USA, Nov. 12 16, 2018, R1-1812913, 7 pages.
3GPP TS 36.213 V15.1.0 (Mar. 2018), 3rd Generation Partnership Project; Technical Specification Group Radio Access Network; Evolved Universal Terrestrial Radio Access (E-UTRA); Physical layer procedures(Release 15), 501 pages.
NEC, Discussion on subband based channel access procedures for NR-U. 3GPP TSG RAN WG1 Meeting #93, Busan, Korea, May 21 25, 2018, R1-1806670, 3 pages.
Huawei, HiSilicon, NR frame structure on unlicensed bands. 3GPP TSG RAN WG1 Meeting #93, Busan, Korea, May 21 May 25, 2018, R1-1805917, 8 pages.
Nokia, Nokia Shanghai Bell, On Wideband Operation for NR-U. 3GPP TSG RAN WG1 Meeting #93 Busan, Korea, May 21 25, 2018, R1-1806112, 6 pages.

* cited by examiner

DATA TRANSMISSION METHOD AND COMMUNICATIONS APPARATUS

CROSS-REFERENCE TO RELATED APPLICATIONS

This application is a continuation of International Application No. PCT/CN2019/088509, filed on May 27, 2019, which claims priority to Chinese Patent Application No. 201810556494.X, filed on May 31, 2018. The disclosures of the aforementioned applications are hereby incorporated by reference in their entireties.

TECHNICAL FIELD

This application relates to the communications field, and in particular, to a data transmission method and a communications apparatus.

BACKGROUND

There are abundant spectrum resources on an unlicensed spectrum. Therefore, development and utilization of the unlicensed spectrum has drawn an increasing attention from operators and equipment vendors. Due to an unlicensed feature of the unlicensed spectrum, a plurality of systems may operate on the frequency band, for example, a wireless fidelity (Wi-Fi for short) system, a licensed-assisted access (LAA for short) system, an enhanced licensed-assisted access (eLAA for short) system, a Bluetooth system, and the like. To ensure fair and effective use of the unlicensed spectrum by the plurality of systems, a system operating on the frequency band needs to meet a spectrum etiquette. For example, a distributed channel contention access mechanism is designed for the Wi-Fi system, and the Wi-Fi system coordinates, in a distributed manner, a plurality of systems to access the unlicensed spectrum in a listen before talk (LBT) manner, to avoid interference between a plurality of nodes while ensuring access fairness.

Specifically, before data transmission is initiated for a service, a channel that is currently in an idle state is determined through channel listening, and then the data transmission is performed on the channel in the idle state. After the service accesses a transmission channel through contention, there is a maximum channel occupancy time or a transmission opportunity, to ensure that the plurality of systems fairly access the unlicensed spectrum.

Currently, in the maximum channel occupancy time or the transmission opportunity, a service cannot adjust a channel bandwidth at any time based on a channel status. Consequently, when another channel not occupied by the service is idle, the another channel cannot be effectively used, thereby reducing channel resource utilization.

SUMMARY

Embodiments of this application provide a data transmission method and a network device, to improve channel resource utilization.

According to a first aspect, an embodiment of this application provides a data transmission method, including:

After a service between a network device and a terminal access a channel system (that is, within a channel occupancy time of the service), the network device sends first data to the terminal in a first subframe through a first channel, where the first channel is a channel occupied in the channel system by the service; then the network device performs channel listening on a channel that is not occupied in the channel system by the service, to obtain a listening result; and if the listening result indicates that there is a second channel in an idle state in channels that are not occupied in the channel system by the service, the network device sends second data of the service to the terminal in a second subframe through the first channel and the second channel, where the second subframe is after the first subframe. It may be understood that the service includes the first data and the second data, and a data frame of the service includes the first subframe and the second subframe.

In an embodiment of this application, the network device performs, within the channel occupancy time of the service, channel listening on the channel that is not occupied by the service, and when there is a channel in the idle state in the channels that are not occupied by the service, the channel in the idle state is used for transmitting the data of the service. In other words, the channel in the idle state may be used for data transmission in a timely manner, so that channel resource utilization can be effectively improved.

In an embodiment, in different cases, the network device may perform, in different manners, listening on a channel that is not occupied in the channel system by the service. Specific cases are as follows:

In an embodiment, if the first subframe is a self-contained subframe, the network device performs, in a time period corresponding to an uplink symbol in the first subframe, channel listening on the channel that is not occupied in the channel system by the service. That is, after a downlink symbol in the first subframe is sent, the network device adjusts a status of a transmitter to a receiving status, then receives the uplink symbol in the first subframe, and starts channel listening in the time period corresponding to the uplink symbol.

It may be understood that the uplink symbol and the downlink symbol may be orthogonal frequency division multiplexing (OFDM for short) symbols, or may be corresponding symbols in another communications system. This is not specifically limited herein.

In an embodiment, if the data frame of the service includes a non-self-contained subframe, that is, the first subframe is a downlink subframe, the network device may perform, in a time period corresponding to N downlink symbols in the first subframe, listening on the channel that is not occupied in the channel system by the service, where N is a positive integer, and the N downlink symbols do not carry data. That is, the network device adjusts, in the time period corresponding to the N downlink symbols that do not carry data in the first subframe, a status of a transmitter to a receiving status, and then starts channel listening.

In an embodiment, the N downlink symbols may be last N downlink symbols in the first subframe. In this case, the network device may send complete downlink data in the first subframe, and may immediately adjust, after an idle channel is detected in a time period corresponding to the last N downlink symbols, a channel bandwidth in the second subframe. It may be understood that, if the network device performs channel listening on first N downlink symbols or middle N downlink symbols in the first subframe, after detecting an idle channel, the network device needs to reserve the idle channel for the service, and a specific manner may be that the network device sends, on the idle channel, invalid data or other data that may be used by the service for occupying the idle channel.

In an embodiment, the data frame of the service includes a non-self-contained subframe, and the data of the service further includes a third subframe and a fourth subframe, where the third subframe is a four-row subframe, the fourth subframe is a downlink subframe, the third subframe is adjacent to the fourth subframe, the third subframe is before the fourth subframe, the third subframe is after the second subframe, and the service further includes third data. In this case, the network device performs, in a time period corresponding to the third subframe, channel listening on a channel that is not occupied in the channel system by the service, and when there is a third channel in the idle state, the network device sends the third data of the service to the terminal in the fourth subframe through the first channel, the second channel, and the third channel.

In an embodiment, when the channel system applies an inter-band carrier aggregation technology, the network device performs, in any time period before the second subframe, listening on a channel that is not occupied in the channel system by the service. It should be understood that any time period before the second subframe is a time period of a channel occupancy time of the service, where the channel occupancy time is a time period in which data transmission of the service is allowed to be performed after the service accesses the channel system. In the inter-band carrier aggregation technology, adjacent interference is relatively small. Therefore, when the network device performs channel listening, the network device may continuously transmit data in the first subframe, and does not need to reserve N downlink symbols to carry data.

In an embodiment, the network device may further send a downlink control message to the terminal, where the downlink control message carries uplink scheduling information and indication information that is used to indicate a transmission bandwidth of the service. In this way, the terminal may be notified of the transmission channel bandwidth of the service in a timely manner, so that the terminal may adjust, at any time, a channel bandwidth for sending uplink data, thereby increasing a transmission rate of the service.

It may be understood that the network device may send the downlink control message to the terminal when the channel bandwidth changes, or may send the downlink control message each time downlink data is sent. In addition, the downlink control message and the downlink data may be included in a same data frame for sending, or may be each sent as a data frame for sending. A specific manner is not limited herein.

In an embodiment, because there is a delay in data processing by the network device, the network device may perform corresponding processing on the data of the service T milliseconds in advance. In a specific solution, the network device may determine a minimum channel bandwidth of the channel system, then process to-be-sent data of the service based on a minimum channel bandwidth granularity, or the network device processes to-be-sent data based on a transmission channel bandwidth corresponding to the to-be-sent data of the service. In this way, the to-be-sent data is processed in advance, so that a data transmission rate can be effectively increased.

In an embodiment, when a relationship between a traffic volume of the service and a channel bandwidth meets a preset condition, the network device may perform channel listening on a channel that is not occupied in the channel system by the service. Specifically, the following several cases may be included: If the channel bandwidth occupied by the service in the channel system can meet the traffic volume requirement of the service, the network device may no longer perform channel listening. If the channel bandwidth occupied by the service in the channel system cannot meet the traffic volume requirement of the service, the network device needs to perform channel listening. In this way, the channel listening is performed as required, and the channel bandwidth is adjusted as required, so that a plurality of services can fairly and quickly access the channel system, to complete data transmission.

According to a second aspect, an embodiment of this application describes a data transmission method in an embodiment of this application from a perspective of a terminal, including:

The terminal receives first data sent by the network device in a first subframe through a first channel, where the first channel is a channel occupied in a channel system by a service between the network device and the terminal; then the terminal receives second data sent by the network device in a second subframe through the first channel and the second channel, where the second channel is a channel that is in an idle state and that is obtained by the network device by performing channel listening on a channel that is not occupied in the channel system by the service. The service includes the first data and the second data, and a data frame of the service includes the first subframe and the second subframe.

In an embodiment, the network device performs, within a channel occupancy time of the service, channel listening on the channel that is not occupied by the service, and when there is a channel in the idle state in the channels that are not occupied by the service, the channel in the idle state is used for transmitting the data of the service. In other words, the channel in the idle state may be used for data transmission in a timely manner, so that channel resource utilization can be effectively improved.

In an embodiment, there are the following several possible manners for a specific time at which the network device performs channel listening on the channel that is not occupied in the channel system by the service.

In an embodiment, when the first subframe is a self-contained subframe, the network device performs, in a time period corresponding to an uplink symbol in the first subframe, channel listening on a channel that is not occupied in the channel system by the service.

In an embodiment, the data frame of the service includes a non-self-contained subframe, and when the first subframe is a downlink subframe, the network device performs, in a time period corresponding to N downlink symbols in the first subframe, channel listening on a channel that is not occupied in the channel system by the service.

In an embodiment, the data frame of the service includes a non-self-contained subframe, and the data frame further includes a third subframe and a fourth subframe, where the third subframe is an uplink subframe, the fourth subframe is a downlink subframe, the third subframe is adjacent to the fourth subframe, the third subframe is before the fourth subframe, the third subframe is after the second subframe, and the service further includes third data. In this case, the network device performs, in a time period corresponding to the third subframe, channel listening on a channel that is not occupied in the channel system by the service; and then the terminal receives the third data sent by the network device in the fourth subframe through the first channel, the second channel, and the third channel.

In an embodiment, when the channel system applies inter-band carrier aggregation, the network device performs, in any time period before the second subframe, listening on a channel that is not occupied in the channel system by the service. It should be understood that when the channel system applies the intra-band carrier aggregation, the network device performs corresponding channel listening based on the data frame of the service.

In an embodiment, the terminal may further receive a downlink control message sent by the network device, where the downlink control message carries uplink scheduling information and indication information that is used to indicate a transmission bandwidth of the service.

In an embodiment, the first data is processed by the network device based on a minimum bandwidth granularity that is of the channel system and that corresponds to the first subframe, and the second data is processed by the network device based on the minimum bandwidth granularity that is of the channel system and that corresponds to the second subframe. In this way, to-be-sent data is processed in advance, so that a data transmission rate can be effectively increased.

In an embodiment, channel listening is performed on a channel that is not occupied in the channel system by the service when a relationship between a traffic volume of the service and a channel bandwidth meets a preset condition. Specifically, the following several cases may be included: If the channel bandwidth occupied by the service in the channel system can meet the traffic volume requirement of the service, the network device may no longer perform channel listening. If the channel bandwidth occupied by the service in the channel system cannot meet the traffic volume requirement of the service, the network device needs to perform channel listening. In this way, the channel listening is performed as required, and the channel bandwidth is adjusted as required, so that a plurality of services can fairly and quickly access the channel system, to complete data transmission.

According to a third aspect, an embodiment of this application provides a communications apparatus on a network side. The apparatus has a function of implementing behavior of the network device in the first aspect. The function may be implemented by hardware, or may be implemented by hardware executing corresponding software. The hardware or the software includes one or more modules corresponding to the foregoing function.

In an embodiment, the apparatus includes units or modules configured to perform the operations in the first aspect. For example, the apparatus includes: a sending module, configured to send first data to a terminal in a first subframe through a first channel, where the first channel is a channel occupied in a channel system by a service between the communications apparatus and the terminal;

a processing module, configured to perform channel listening on a channel that is not occupied in the channel system by the service, where the sending module is further configured to: when there is a second channel in an idle state, send second data of the service to the terminal in a second subframe through the first channel and the second channel, where the second subframe is after the first subframe.

In an embodiment, the apparatus further includes a storage module, configured to store a program instruction and data that are necessary for the network device.

In a possible implementation, the apparatus includes a processor and a transceiver. The processor is configured to support the network device in performing a corresponding function in the method according to the first aspect. The transceiver is configured to: indicate communication between the network device and a terminal, and send information or an instruction in the foregoing method to the terminal. Optionally, the apparatus may further include a memory. The memory is configured to be coupled to the processor, and the memory stores a program instruction and data that are necessary for the network device.

In an embodiment, when the apparatus is a chip in the network device, the chip includes a processing module and a transceiver module. The transceiver module may be, for example, an input/output interface, a pin, or a circuit on the chip. The transceiver module is configured to: send first data to a terminal in a first subframe through a first channel, where the first channel is a channel occupied in a channel system by a service between the network device and the terminal; and send second data to the terminal in the second subframe through the first channel and the second channel. The processing module may be, for example, a processor, and the processor is configured to perform channel listening on a channel that is not occupied in the channel system by the service. The processing module may execute a computer-executable instruction stored in a storage unit, to support the network device in performing the method according to the first aspect. Optionally, the storage unit may be a storage unit in the chip, for example, a register or a buffer. Alternatively, the storage unit may be a storage unit located outside the chip, for example, a read-only memory (read-only memory, ROM for short), another type of static storage device that can store static information and an instruction, a random access memory (random access memory, RAM for short), or the like.

In an embodiment, the apparatus includes a processor, a baseband circuit, a radio frequency circuit, and an antenna. The processor is configured to control some functions of each circuit, and the baseband circuit is configured to perform channel listening or complete corresponding determining and control. After being processed by the radio frequency circuit, such as analog conversion, filtering, amplification, and up-conversion, a signal is then sent to the terminal via the antenna. Optionally, the apparatus further includes a memory, and the memory stores a program instruction and data that are necessary for the communications apparatus.

Any one of the processors mentioned above may be a general-purpose central processing unit (CPU for short), a microprocessor, an application-specific integrated circuit (ASIC for short), or one or more integrated circuits for controlling program execution of the method for coordinated allocation of channel resources according to the foregoing aspects.

According to a fourth aspect, an embodiment of this application provides a communications apparatus on a terminal side. The apparatus has a function of implementing behavior of the terminal in the second aspect. The function may be implemented by hardware, or may be implemented by hardware executing corresponding software. The hardware or the software includes one or more modules corresponding to the foregoing function.

In an embodiment, the terminal includes units or modules configured to perform the operations in the second aspect. For example, the terminal includes: a receiving module, configured to: receive first data sent by the communications apparatus in a first subframe through a first channel, where the first channel is a channel occupied in a channel system by a service between the network device and the terminal; receive second data sent by the network device in a second subframe through the first channel and a second channel, where the second channel is a channel that is in an idle state and that is obtained by the network device by performing channel listening on a channel that is not occupied in the channel system by the service. The service includes the first data and the second data, and a data frame of the service includes the first subframe and the second subframe.

In an embodiment, the terminal further includes a storage module, configured to store a program instruction and data that are necessary for the terminal.

Optionally, the terminal further includes a processing module, configured to invoke the program instruction in the storage module to complete the operations in the second aspect.

In an embodiment, the terminal includes a processor and a transceiver. The processor is configured to support the terminal in performing a corresponding function in the method according to the second aspect. The transceiver is configured to: indicate communication between the network device and the terminal, and send information or an instruction in the foregoing method to the network device. Optionally, the terminal may further include a memory. The memory is configured to be coupled to the processor, and the memory stores a program instruction and data that are necessary for the terminal.

In an embodiment, when the apparatus is a chip in the terminal, the chip includes a processing module and a transceiver module. The transceiver module may be, for example, an input/output interface, a pin, or a circuit on the chip. The transceiver module is configured to: receive first data sent by a network device in a first subframe through a first channel, where the first channel is a channel occupied in a channel system by a service between the network device and the terminal; receive second data sent by the network device in a second subframe through the first channel and a second channel, where the second channel is a channel that is in an idle state and that is obtained by the network device by performing channel listening on a channel that is not occupied in the channel system by the service. The service includes the first data and the second data, and a data frame of the service includes the first subframe and the second subframe. The processing module may be, for example, a processor. The processing module may execute a computer-executable instruction stored in a storage unit, to support the terminal in performing the method according to the second aspect. Optionally, the storage unit may be a storage unit in the chip, for example, a register or a buffer. Alternatively, the storage unit may be a storage unit located outside the chip, for example, a read-only memory (read-only memory, ROM for short), another type of static storage device that can store static information and an instruction, a random access memory (random access memory, RAM for short), or the like.

In an embodiment, the apparatus includes a processor, a baseband circuit, a radio frequency circuit, and an antenna. The processor is configured to control some functions of each circuit, and the baseband circuit is configured to complete corresponding determining and control. After being processed by the radio frequency circuit, such as analog conversion, filtering, amplification, and up-conversion, a signal is then sent to the network device via the antenna. Optionally, the apparatus further includes a memory, and the memory stores a program instruction and data that are necessary for the communications apparatus.

Any one of the processors mentioned above may be a general-purpose central processing unit (CPU), a microprocessor, an application-specific integrated circuit (ASIC), or one or more integrated circuits for controlling program execution of the method for coordinated allocation of channel resources according to the foregoing aspects.

According to a fifth aspect, an embodiment of this application provides a computer-readable storage medium, where the computer storage medium stores a computer instruction, and the computer instruction is configured to perform the method according to any one of the possible implementations of the first aspect and the second aspect.

According to a sixth aspect, an embodiment of this application provides a computer program product including an instruction. When the computer program product runs on a computer, the computer is enabled to perform the methods according to any one of the foregoing aspects.

According to a seventh aspect, this application provides a chip system, where the chip system includes a processor, configured to support a data sending device in implementing functions in the foregoing aspects, for example, generating or processing data and/or information in the foregoing method. In a possible design, the chip system further includes a memory. The memory is configured to store a program instruction and data that are necessary for the data sending device, to implement functions in any one of the foregoing aspects. The chip system may include a chip, or may include a chip and another discrete component.

In an embodiment, when the chip system runs on the network device side, the network device may be supported in performing the method according to the first aspect.

In an embodiment, when the chip system runs on the terminal side, the terminal side may be supported in performing the method according to the second aspect.

According to an eighth aspect, an embodiment of this application provides a communications system. The system includes the network device and the terminal in the foregoing aspects.

In the embodiments of this application, the network device performs, within the channel occupancy time of the service, channel listening on the channel that is not occupied by the service, and when there is a channel in an idle state in the channels that are not occupied by the service, the channel in the idle state is used for transmitting the data of the service. In other words, the channel in the idle state may be used for data transmission in a timely manner, so that channel resource utilization can be effectively improved.

DESCRIPTION OF EMBODIMENTS

Figure 1:
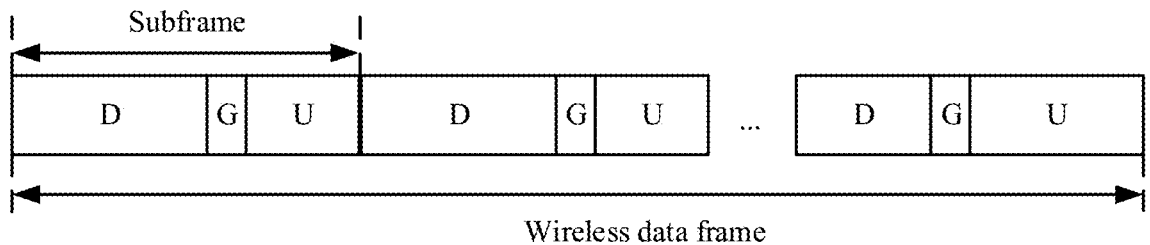
FIG. 1 is a schematic structural diagram of a self-contained subframe according to an embodiment of this application.

Embodiments of this application provide a data transmission method and a communications apparatus, to improve channel resource utilization.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in proper circumstances so that the embodiments described herein can be implemented in other orders than the order illustrated or described herein. Moreover, the terms "include", "have" and any other variants mean to cover non-exclusive inclusion, for example, a process, method, system, product, or device that includes a list of operations or units is not necessarily limited to those operations or units, but may include other operations or units that are not expressly listed or inherent to such a process, method, system, product, or device.

The following explains some terms in the embodiments of this application, to help a person skilled in the art have a better understanding.

1. Unlicensed spectrum: A spectrum that can be used without a license. There are abundant spectrum resources on an unlicensed spectrum. For example, about a 580 MHz bandwidth is available on an UNII frequency band. However, due to an unlicensed feature of the unlicensed spectrum, a plurality of systems may operate on the frequency band, for example, a wireless fidelity (Wi-Fi) system, a licensed-assisted access (LAA) system, an enhanced licensed-assisted access (eLAA) system, a Bluetooth system, a ZigBee (a short-distance and low-power-consumption wireless communications technology) system, a cordless telephone set, and the like.

2. Self-contained subframe: The self-contained subframe has the following features: A same subframe includes a downlink (DL for short), an uplink (UL for short), and a grant point (GP for short). The same subframe includes feedbacks on DL data and a corresponding hybrid automatic repeat request (HARQ for short). UL scheduling information and corresponding data information are transmitted in a same subframe. It can be learned from the foregoing description that, when a communications system supports the self-contained subframe, a specific structure of a data frame sent in the communications system may be shown in FIG. 1: One data frame includes a plurality of self-contained subframes, each subframe of the data frame includes one self-contained subframe, and each self-contained subframe includes a downlink (D), a downlink-uplink grant point (G), and an uplink (U).

3. Non-self-contained subframe: When a communications system supports the non-self-contained subframe, a specific structure of a data frame sent in the communications system may be shown in FIG. 2: One data frame includes a plurality of downlinks (D), one downlink-uplink grant point (S), and a plurality of uplinks (U). One downlink or one uplink occupies one subframe.

4. Listen before talk (LBT for short): The LBT is used to coordinate, in a distributed manner, a plurality of systems to access an unlicensed spectrum, to avoid interference between the plurality of systems while ensuring access fairness. A principle of the LBT is to ensure that only one communications apparatus transmits a signal on a channel in an area at a particular moment. Before initiating service transmission, a communications apparatus needs to listen to whether a channel at a current moment is occupied by another communications apparatus. If the channel is occupied, the communications apparatus needs to wait until the channel is idle, and then accesses the channel. To ensure that a plurality of systems fairly use a channel, before a communications apparatus in the 802.11 system accesses a channel by using a distributed coordination function (DCF for short) mechanism, the communications apparatus needs to first perform channel listening on the channel. If the channel is in an idle state in a distributed (coordination function) interframe space (DIFS for short) period, the communications apparatus sets a backoff random number M, and continues to detect the channel in subsequent M listening slots. If the channel is detected to be idle in the M listening slots, then the communications apparatus starts to send a signal to access the channel.

Specifically, the LBT may include two manners: Type A and Type B. A specific implementation of the LBT is as follows.

Figure 3:
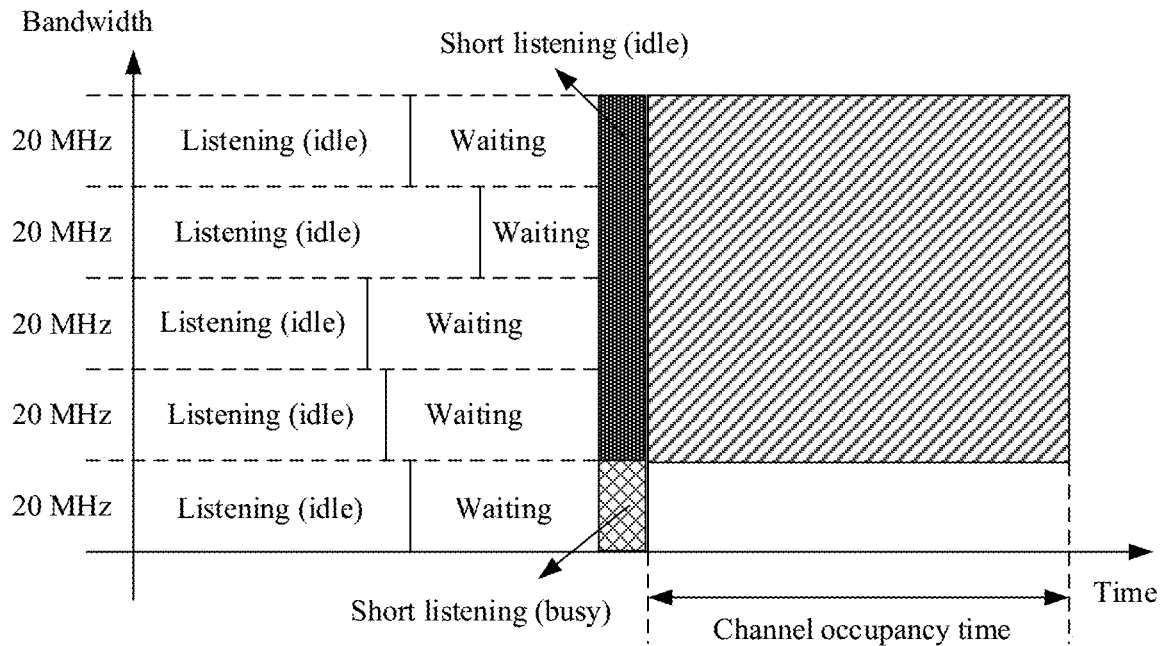
FIG. 3 is a schematic diagram of channel listening performed by using a Type A mechanism according to an embodiment of this application.

In an example, in the Type A mechanism shown in FIG. 3, there is no concept of listening on a primary channel in the Type A mechanism, and a communications apparatus that needs to access a channel may independently start the DCF mechanism on all channels to perform LBT. If the communications apparatus detects that the channel is idle, the communications apparatus may wait until listening on N channels is completed. Before sending, the communications apparatus performs short listening again on a channel that is waiting, and then may perform LTE-U/NR-U transmission on an idle channel.

Figure 4:
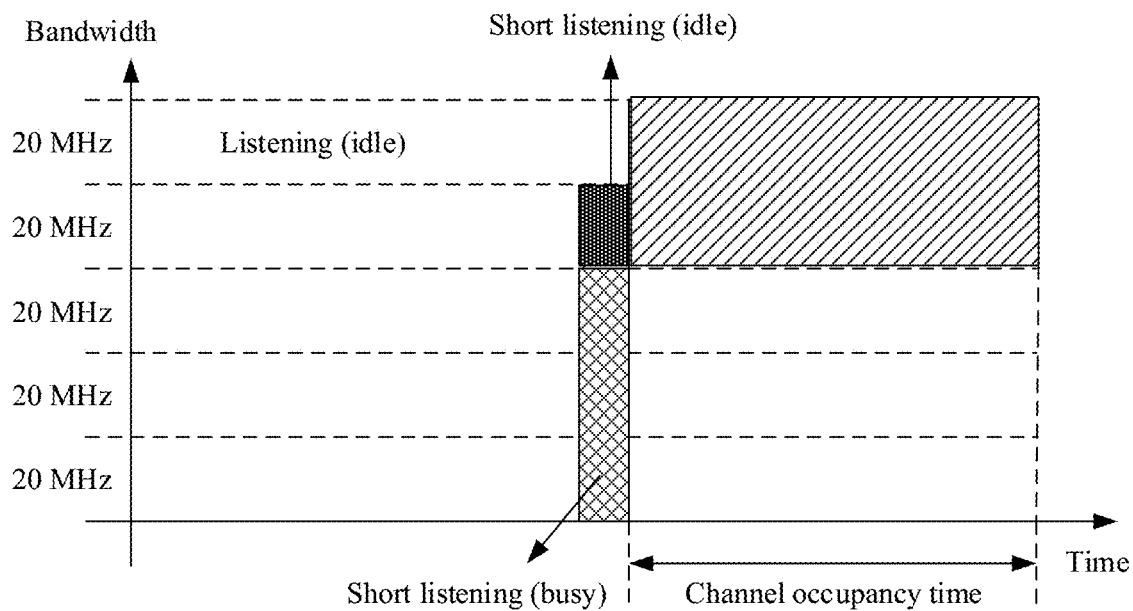
FIG. 4 is a schematic diagram of channel listening performed by using a Type B mechanism according to an embodiment of this application.

In an example, in the Type B mechanism shown in FIG. 4, there is a concept of listening on a primary channel in the Type B mechanism. A communications apparatus that needs to access a channel first starts the DCF mechanism on the primary channel to perform LBT. If detecting that the primary channel is idle, the communications apparatus performs short listening on N−1 channels other than the primary channel, and then may perform LTE-U/NR-U transmission on an idle channel. 5. Channel occupancy time (COT for short): A data transmission time after a service system accesses a channel through contention. To ensure that a plurality of service systems fairly access an unlicensed spectrum, there is a maximum channel occupancy time (MCOT for short) after the service systems complete listening and access the channel. That is, after the service system accesses the channel, a maximum data transmission time before the service system accesses the channel next time by using the LBT mechanism cannot exceed the MCOT. MCOTs are different for different service systems, which may be determined based on a service system level. For example, the LAA protocol specifies that after service systems of different levels access a channel, a value range of an MCOT is from 2 milliseconds to 10 milliseconds. Details may be shown in Table 1.

TABLE 1

| Service system level | $m_p$ | $CW_{min,p}$ | $CW_{max,p}$ | $T_{mcot,p}$ | Value range of $CW_p$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 10 ms | {15, 31, 63} |
| 4 | 7 | 15 | 1023 | 10 ms | {15, 31, 63, 127, 255, 511, 1023} |

$m_p$ is used to indicate fixed listening duration in a listening process, $CW_{min,p}$ is used to indicate a minimum value of a quantity of backoff subframes in the listening process, $CW_{max,p}$ is used to indicate a maximum value of the quantity of backoff subframes in the listening process, and $T_{mcot,p}$ is used to indicate a value of the MCOT.

6. Physical channel: On the physical channel, carriers, scrambling codes, spreading codes, starting times, and ending times of data streams that are on transmission channels and that belong to different users and have different functions are determined according to corresponding rules, related operations are performed, and the data streams are finally modulated into analog radio frequency signals for transmission. Data streams on different physical channels belong to different users or have different functions.

Physical channels include a physical downlink channel and a physical uplink channel. In this embodiment, the following several types are described.

Physical downlink control channel (PDCCH for short): The PDCCH is a main bearer channel for transmitting downlink physical layer control signaling, and carried physical layer control information includes scheduling information for uplink/downlink data transmission and uplink power control command information. The PDCCH channel is transmitted on one or more control channel elements (CCE for short).

Physical downlink shared channel (PDSCH for short): The PDSCH is used for scheduling transmission of downlink data. The PDSCH is a main downlink data bearer channel at a long term evolution (LTE for short) physical layer, and may carry different transmission content (that is, different logical channels) from an upper layer. The transmission content includes paging information, broadcast information, control information, service data information, and the like. As one of key factors of physical layer performance, PDSCH transmission supports various physical layer mechanisms, including channel adaptation scheduling, a hybrid automatic repeat request (HARQ for short), various multiple-input multiple-output (MIMO for short) mechanisms (transmit diversity, spatial multiplexing, and beamforming), and the like.

Physical uplink control channel (PUCCH for short): The PUCCH is used for transmitting uplink control information.

Physical uplink shared channel (PUSCH for short): The PUSCH channel may be used for transmitting a protocol data unit (PDU for short) at a transport layer 2, signaling at a transport layer 3, uplink control information, and user data.

There are abundant spectrum resources on an unlicensed spectrum. Therefore, development and utilization of the unlicensed spectrum has drawn an increasing attention from operators and equipment vendors. Due to an unlicensed feature of the unlicensed spectrum, to ensure fair and effective use of the unlicensed spectrum by a plurality of systems, a system operating on the frequency band needs to meet a spectrum etiquette. For example, a distributed channel contention access mechanism is designed for the Wi-Fi system, and the Wi-Fi system coordinates, in a distributed manner, a plurality of systems to access the unlicensed spectrum in a listen before talk (LBT) manner, to avoid interference between a plurality of nodes while ensuring access fairness. Specifically, before data transmission is initiated for a service, a channel that is currently in the idle state is determined through channel listening, and then the data transmission is performed on the channel in the idle state. After the service accesses a transmission channel through contention, there is a maximum channel occupancy time or a transmission opportunity, to ensure that the plurality of systems fairly access the unlicensed spectrum. Currently, in the maximum channel occupancy time or the transmission opportunity, a service cannot adjust a channel bandwidth at any time based on a channel status. Consequently, when another channel not occupied by the service is idle, the another channel cannot be effectively used, thereby reducing channel resource utilization.

To resolve this problem, the following solution is provided in this embodiment of this application: After a service between a network device and a terminal access a channel system (that is, within a channel occupancy time of the service), the network device sends first data to the terminal in a first subframe through a first channel, where the first channel is a channel occupied in the channel system by the service; then the network device performs channel listening on a channel that is not occupied in the channel system by the service, to obtain a listening result; and if the listening result indicates that there is a second channel in an idle state in channels that are not occupied in the channel system by the service, the network device sends second data of the service to the terminal in a second subframe through the first channel and the second channel, where the second subframe is after the first subframe. It may be understood that the service includes the first data and the second data, and a data frame of the service includes the first subframe and the second subframe.

Figure 5A:
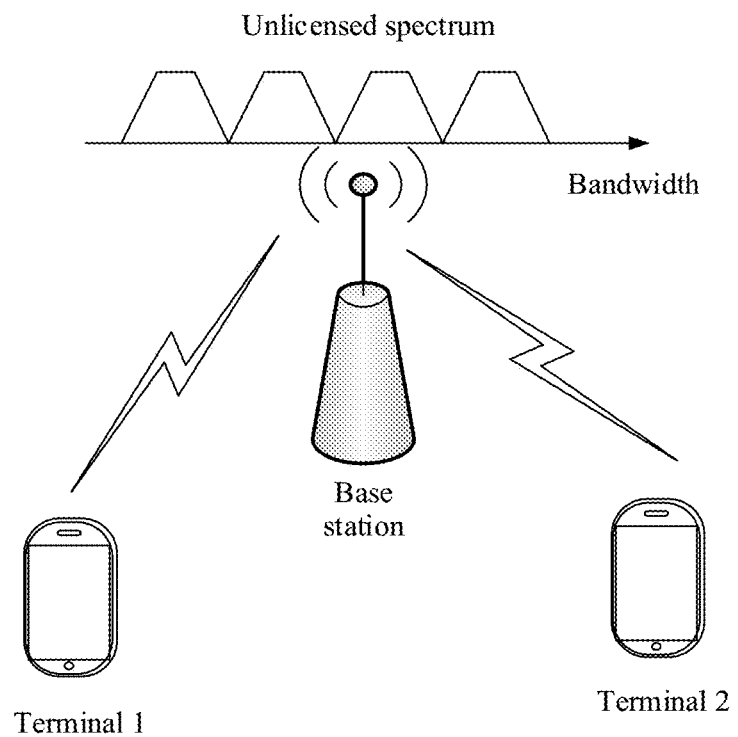
FIG. 5a shows an example application scenario according to an embodiment of this application.

FIG. 5a shows an example application scenario according to an embodiment of this application. The application scenario shown in FIG. 5a is a centralized point-to-multipoint wireless communications access system that operates on an unlicensed frequency band and that has a central node, for example, a cellular communications system such as an LTE-U, an NR-U, or a Wi-Fi system.

Figure 5B:
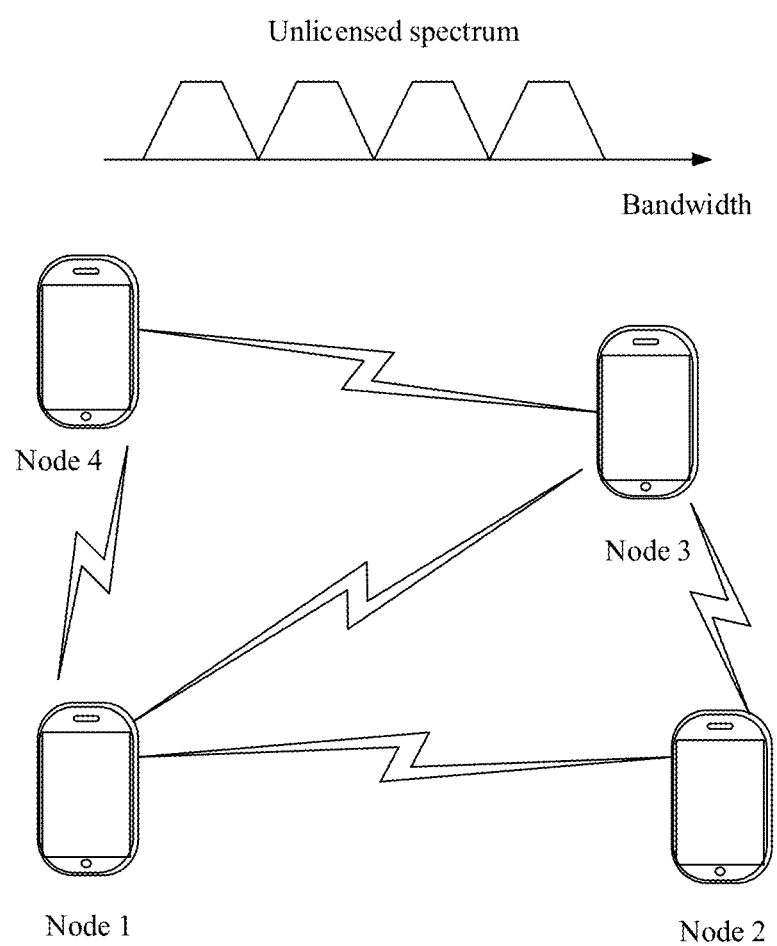
FIG. 5b shows another example application scenario according to an embodiment of this application.

FIG. 5b shows another example application scenario according to an embodiment of this application. The application scenario shown in FIG. 5b is a distributed point-to-multipoint wireless communications access system that operates on an unlicensed frequency band and that has no central node, for example, a device-to-device (D2D for short) communication system and a Wi-Fi communication system that operate on an unlicensed frequency band.

Figure 5C:
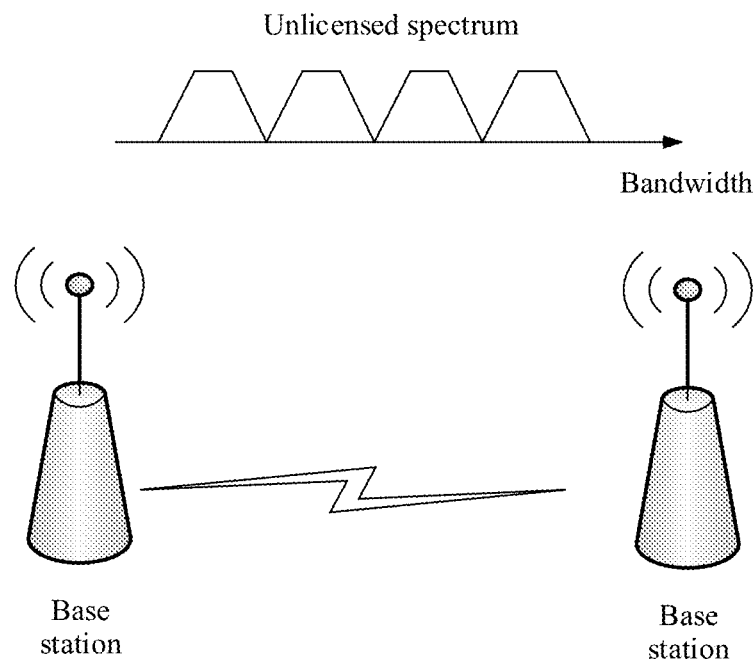
FIG. 5c shows still another example application scenario according to an embodiment of this application.

FIG. 5c shows still another example application scenario according to an embodiment of this application. The application scenario shown in FIG. 5c is a point-to-point wireless communications backhaul system that operates on an unlicensed frequency band.

A person skilled in the art may understand that the terminal in this application may be any user terminal, user apparatus, access apparatus, subscriber station, subscriber unit, mobile station, user agent, or user equipment that has a wireless communication function or may have another name. The user terminal may include various handheld devices that have a wireless communication function, vehicle-mounted devices, wearable devices, computing devices, or other processing devices connected to wireless modems, and various forms of user equipments (UE for short), mobile stations (MS for short), terminals, terminal equipments, portable communications devices, hand-held phones, portable computing devices, entertainment devices, game devices or systems, global positioning system devices, any other suitable devices configured for network communication via wireless media, and the like.

The network device in the embodiments of this application is an entity that is on a network side and that is configured to send or receive a signal, and may be a base station or another device. The base station may be a global system for mobile communications (GSM for short) system, a base transceiver station (BTS for short) in a code division multiple access (CDMA for short) system, a base station (nodeB) in a wideband code division multiple access (WCDMA for short) system, or may be an evolved NodeB (eNB or e-NodeB for short) in LTE, a base station in a 5th generation (5G for short) mobile communications technology system, a base station in another new access network (NR for short) system, or a base station in a subsequent evolved communications system. This is not specifically limited in the embodiments of this application.

Figure 6:
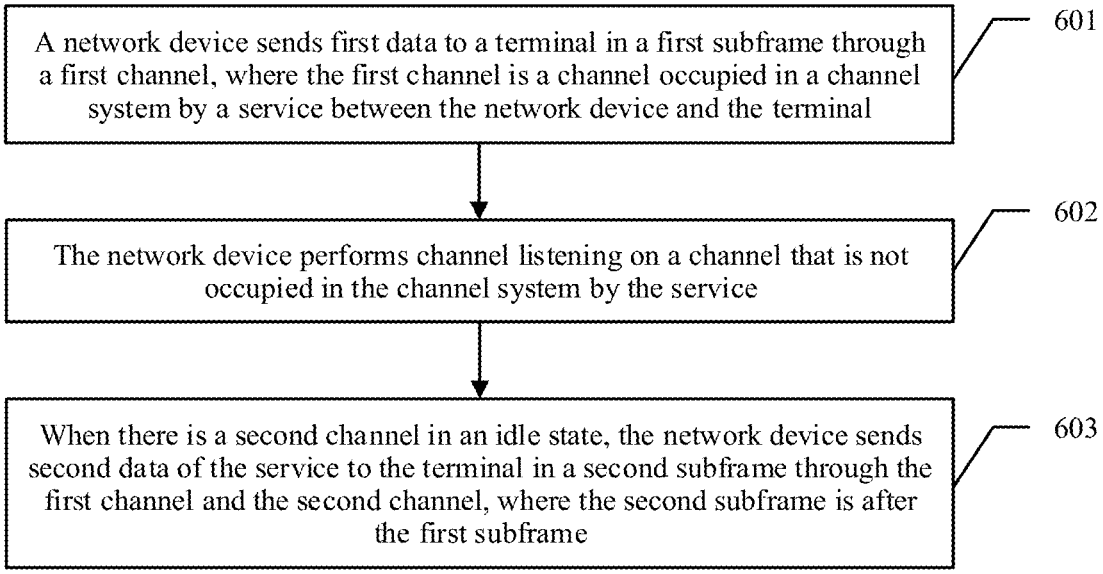
FIG. 6 is a schematic diagram of an embodiment of a data transmission method according to an embodiment of this application.

The following describes the technical solutions in the embodiments of this application with reference to more accompanying drawings. FIG. 6 shows a data transmission method according to an embodiment of this application. The method includes the following operations.

601. A network device sends first data to a terminal in a first subframe through a first channel, where the first channel is a channel occupied in a channel system by a service between the network device and the terminal.

When there is a first channel in an idle state in the channel system, the network device carries the first data of the service in the first subframe through the first channel, and sends the first data to the terminal.

It should be understood that before the network device sends the first data of the service to the terminal in the first subframe through the first channel, the service needs to perform channel contention. When the service is in a channel contention phase, the network device performs channel listening on each channel in the channel system based on listening parameters of the service, to determine state information of each channel, and then selects a channel in the idle state as a data transmission channel of the service. The first channel includes a channel accessed by the service in the channel contention phase.

The listening parameters of the service include but are not limited to a quantity of backoff subframes, a channel occupancy time, and a transmission bandwidth of the service. It should be understood that the listening parameters may be determined by the network device based on the service or according to a stipulation in a protocol. For example, the channel occupancy time may be determined based on a service priority of the service; the transmission bandwidth of the service may be determined based on an actual traffic volume of the service; and the quantity of backoff subframes may be randomly determined.

In an example, if the network device performs channel listening in a short listening manner, the network device may determine listening duration of short listening based on a status of a data frame of a service. For example, it is assumed that the network device selects sending duration of a last OFDM symbol in each subframe of the data frame as the listening duration, and the sending duration of the last OFDM symbol is 71 microseconds. In this case, the listening duration of short listening may be 25 microseconds.

In another example, if the network device performs channel listening in a long listening manner, the network device may determine fixed listening duration of long listening based on a status of a data frame of a service, and randomly generate a quantity of backoff subframes. For example, it is assumed that the base station selects sending duration of a last OFDM symbol in each subframe of the data frame as the listening duration, and the sending duration of the last OFDM symbol is 71 microseconds. In this case, the network device may determine that the fixed listening duration of each channel is 25 microseconds.

It should be understood that the network device may perform channel listening by using two LBT mechanisms: Type A and Type B. A specific implementation is not limited herein.

It should be understood that the network device may further send a downlink control channel through the first channel, and the downlink control channel carries indication information used to indicate the transmission bandwidth of the service. In an embodiment, the downlink control channel may be a PDCCH, and the terminal blindly detects the PDCCH on a bandwidth of the channel system, and receives downlink data based on an indication of a downlink scheduling message in the PDCCH, or initiates uplink transmission on a corresponding resource based on an indication of an uplink scheduling message. In addition, if the terminal detects a PDCCH among the channels, it is considered that the channel is used by the service, and UL transmission, for example, UL grant free transmission and preamble transmission, may be performed on the channel.

It should be understood that because there is a delay in data processing by the network device, the network device usually performs corresponding processing on to-be-sent data of the service based on a channel bandwidth in advance by a preset time. In an example, if a current information system is a system greater than 20 MHz, the network device may schedule the service at a granularity of 20 MHz and process the to-be-sent data of the service. A specific implementation includes: for a channel whose state information indicates the idle state, the network device directly sends processed to-be-sent data on the channel; and for a channel whose state information indicates a busy state, the network device abandons processed to-be-sent data on the channel, and re-processes and sends the abandoned to-be-sent data on a next transmission opportunity or on another channel in the idle state. The state information of the channel includes indication of the idle state and the busy state. If the channel is released by a previous service and is currently not occupied by any service, the state information of the channel indicates the idle state; or if the channel is being occupied by a service, the state information of the channel indicates the busy state.

602. The network device performs channel listening on a channel that is not occupied in the channel system by the service.

The network device performs, in a channel occupancy time, channel listening on the channel that is not occupied in the channel system by the service.

In an embodiment, when a relationship between a traffic volume of the service and a channel bandwidth meets a preset condition, the network device needs to perform channel listening on the channel that is not occupied in the channel system by the service. Specifically, the preset condition may be that the traffic volume of the service is greater than a preset threshold or the traffic volume is greater than a bearing capacity of a current information bandwidth. A specific case is not limited herein. In an example, if a bandwidth of the first channel is 40 Hz, and the traffic volume of the service needs to be carried on a bandwidth of 80 Hz, the network device may determine to perform listening on a channel that is not occupied in the channel system by the service, to adjust the channel bandwidth for carrying the service.

In this embodiment, a data frame structure of the service or a type of the channel system may affect a process in which the network device performs channel listening. Details are as follows:

In an embodiment, when the data frame structure of the service is a self-contained frame structure, because downlink data and uplink data (as shown in FIG. 1, D is the downlink data, and U is the uplink data) are included in one subframe in the self-contained frame structure, after the downlink data in the subframe is sent, the network device switches a status of a transmitter of the network device to a receiving status, to start to receive uplink transmission data, and simultaneously starts channel listening on a channel that is not occupied in the channel system by the service.

Figure 2:
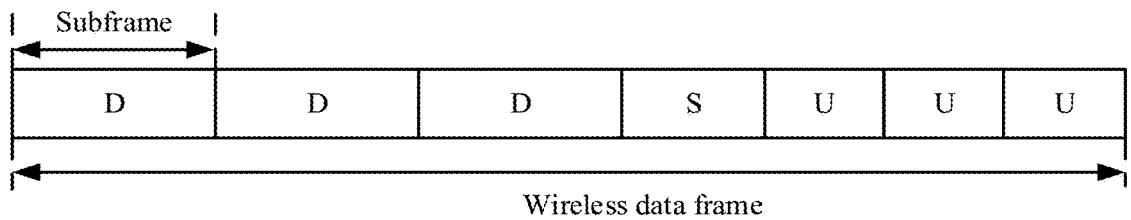
FIG. 2 is a schematic structural diagram of a non-self-contained subframe according to an embodiment of this application.

In an embodiment, when the data frame structure of the service is a non-self-contained frame structure, because in the non-self-contained frame structure, there is generally only one grant point between downlink data and uplink data (as shown in FIG. 2, D is a downlink subframe, U is an uplink subframe, and S is a special subframe) within one channel occupancy time, the network device switches a status of a transmitter of the network device to an access state in a time period corresponding to N downlink symbols in the downlink subframe, and simultaneously starts channel listening on a channel that is not occupied in the channel system by the service.

In an embodiment, the N downlink symbols may be last N downlink symbols in the first subframe. In this case, the network device may send complete downlink data in the first subframe, and may immediately adjust, after an idle channel is detected in a time period corresponding to the last N downlink symbols, a channel bandwidth in the second subframe. It may be understood that, if the network device performs channel listening on first N downlink symbols or middle N downlink symbols in the first subframe, after detecting an idle channel, the network device needs to reserve the idle channel for the service, and a specific manner may be that the network device sends, on the idle channel, invalid data or other data that may be used by the service for occupying the idle channel.

It may be understood that the downlink symbol may be an orthogonal frequency division multiplexing (OFDM for short) symbol, or may be a corresponding symbol in another communications system. This is not specifically limited herein.

In an embodiment, the data frame of the service includes a non-self-contained subframe, and the data of the service further includes a third subframe and a fourth subframe, where the third subframe is a four-row subframe, the fourth subframe is a downlink subframe, the third subframe is adjacent to the fourth subframe, the third subframe is before the fourth subframe, the third subframe is after the second subframe, and the service further includes third data. In this case, the network device performs, in a time period corresponding to the third subframe, channel listening on a channel that is not occupied in the channel system by the service, and when there is a third channel in the idle state, the network device sends the third data of the service to the terminal in the fourth subframe through the first channel, the second channel, and the third channel. That is, when the data frame structure of the service is a non-self-contained frame structure, and the non-self-contained frame structure includes a "downlink-uplink-downlink" structure, the network device starts, in a time period corresponding to an uplink subframe, channel listening on a channel that is not occupied in the channel system by the service.

In an embodiment, for example, the channel system is applied to a large-bandwidth scenario in which a carrier aggregation technology is used. The carrier aggregation includes inter-band carrier aggregation and intra-band carrier aggregation. The inter-band carrier aggregation means that a plurality of component carriers (CC for short) are aggregated for transmission on different frequency bands, and the intra-band carrier aggregation means that a plurality of CCs are aggregated for transmission on a same frequency band. For the inter-band carrier aggregation, the network device may perform channel listening on the channel that is not occupied in the channel system by the service by using the foregoing two solutions. For the intra-band carrier aggregation, the network device may perform, at any moment in a channel occupancy time of the service, channel listening on the channel that is not occupied in the channel system by the service.

603. When there is a second channel in the idle state, the network device sends second data of the service to the terminal in a second subframe through the first channel and the second channel, where the second subframe is after the first subframe.

When determining that there is a second channel in the idle state, the network device carries the second data of the service in the second subframe through the first channel and the second channel, and sends the second data to the terminal.

In an embodiment, the network device performs, within the channel occupancy time of the service, channel listening on the channel that is not occupied by the service, and when there is a channel in the idle state in the channels that are not occupied by the service, the channel in the idle state is used for transmitting the data of the service. In other words, the channel in the idle state may be used for data transmission in a timely manner, so that channel resource utilization can be effectively improved.

To better understand the solutions in the embodiments of this application, an example in which an application scenario of an NR-U system that operates in an unlicensed spectrum is used below for description. Specifically, it is assumed that a channel bandwidth of the NR-U system is 100 MHz, and a maximum of five channels each with 20 MHz are used, which are marked as CH1, CH2, CH3, CH4, and CH5.

Figure 7:
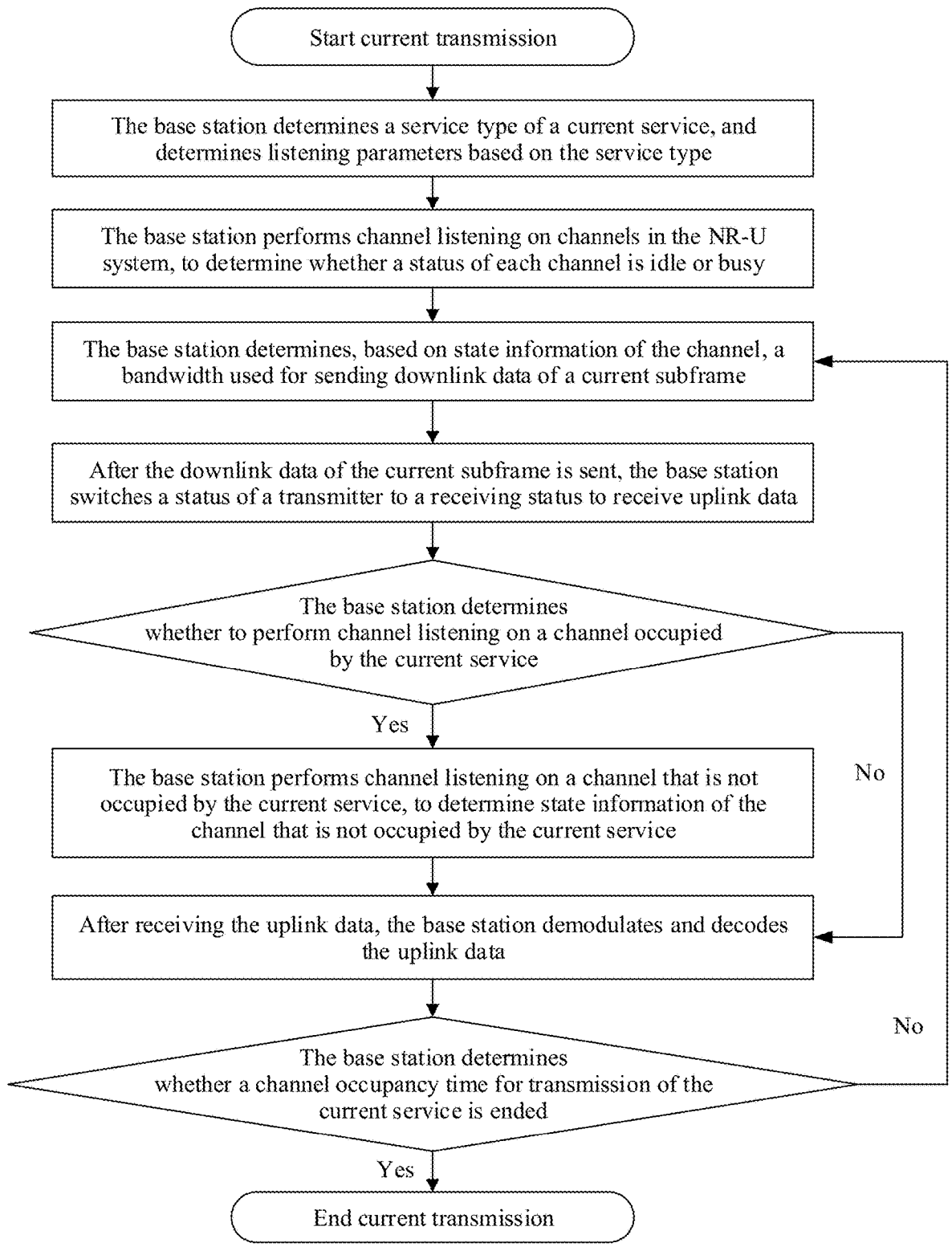
FIG. 7 is a schematic flowchart of data transmission in a scenario in which a data frame structure is a self-contained subframe according to an embodiment of this application.

As shown in FIG. 7, based on an implementation method of a self-contained subframe structure, a procedure of the method is as follows:

First, current service transmission is started. Then Operation 1: When a service is in a channel contention phase, the base station first determines a service type of the service, and determines listening parameters based on the service type, for example, a quantity of backoff subframes, a channel occupancy time, and a current transmission bandwidth.

It should be understood that the listening parameters may be determined by the base station based on the service or according to a stipulation in a protocol. For example, the channel occupancy time may be determined based on a service priority of the service; and the transmission bandwidth of the service may be determined based on an actual traffic volume of the service.

In an embodiment, in an example, the base station performs channel listening in a short listening manner. It is assumed that the base station selects sending duration of a last OFDM symbol of uplink data in a data frame as the listening duration, and the sending duration of the last OFDM symbol is 71 microseconds. In this case, the base station may determine that the listening duration of short listening is 25 microseconds. That is, the base station may perform listening on each of the five channels CH1 to CH5 for 25 microseconds.

In another example, if the base station performs channel listening in a long listening manner, the base station may determine, based on a status of a data frame of a service, duration of a listening slot for long listening and a quantity of backoff subframes. It is assumed that the base station selects sending duration of a last OFDM symbol in each subframe of a data frame as the listening duration, and the sending duration of the last OFDM symbol is 71 microseconds. In this case, the base station may determine that the fixed listening duration of long listening is 25 microseconds. The quantity of backoff subframes is randomly generated by the base station. For example, there may be 5, 5, 4, 3, and 10 backoff subframes respectively of the channels CH1 to CH5.

Operation 2: The base station performs channel listening on channels in the NR-U system, to determine whether a status of each channel is idle or busy.

The base station performs listening on the channels in the NR-U system based on the listening parameters determined in operation 1, to determine state information of the five channels. It should be understood that the state information of the channel includes indication of the idle state and the busy state. If the channel is released by a previous service and is currently not occupied by any service, the state information of the channel indicates the idle state; or if the channel is being occupied by a service, the state information of the channel indicates the busy state.

Figure 8:
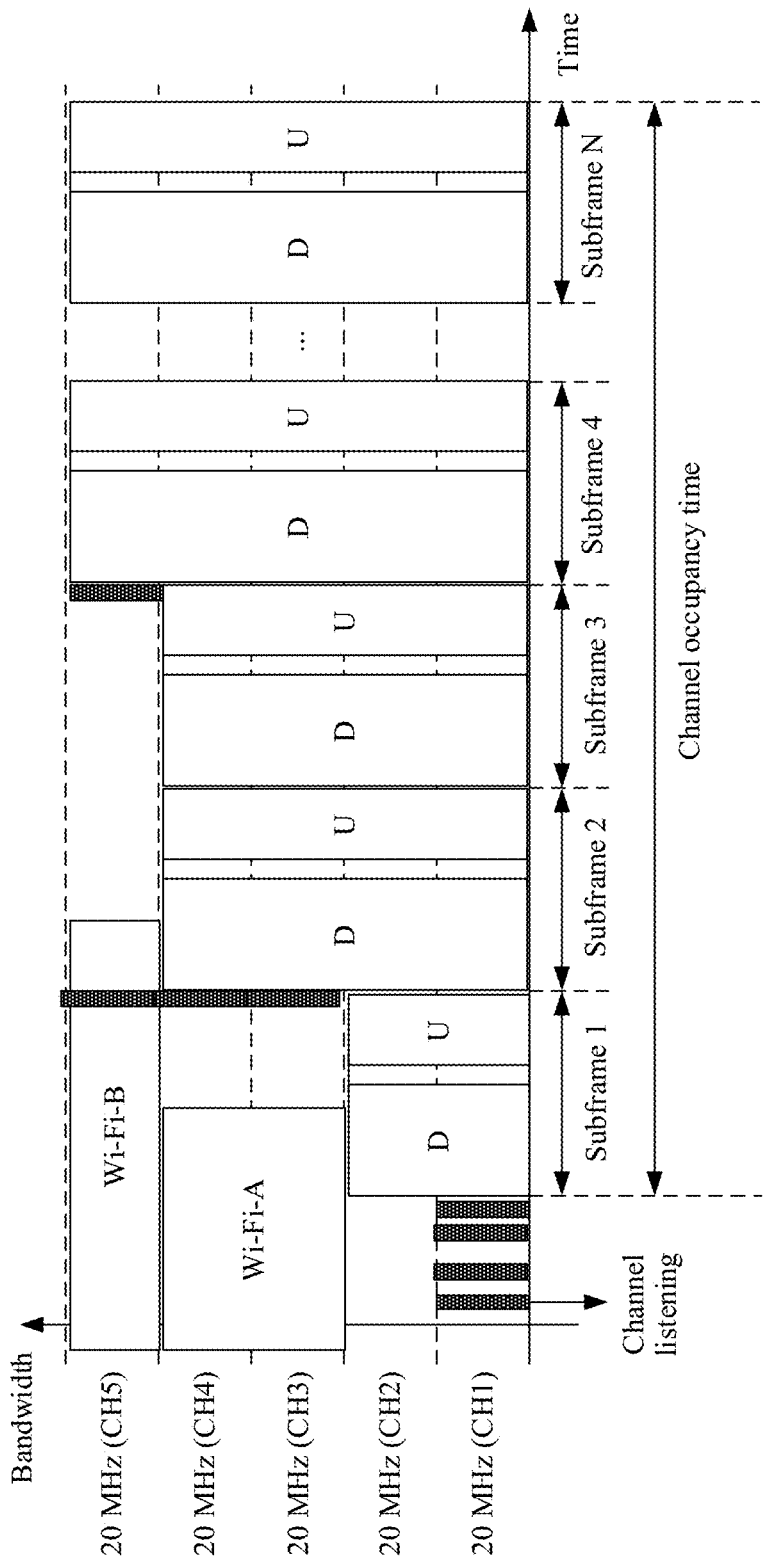
FIG. 8 is a schematic diagram of a channel listening process in which a data frame structure is a self-contained subframe according to an embodiment of this application.

It can be learned from the foregoing description that, if the base station uses short listening, the base station determines the state information of the five channels after performing listening on each channel for 25 microseconds. If the base station uses long listening, after performing fixed-duration listening on each channel for 25 microseconds, if the state information of the channel indicates the idle state, the base station performs short listening on the channel again based on the quantity of backoff subframes of each channel, or if the state information of the channel in the backoff subframe still indicates the idle state, the base station determines that the channel is in the idle state, and sends a signal to access the channel. As shown in FIG. 8, before accessing the channel in a subframe 1, the base station performs listening on the CH1 channel to the CH5 channel, and determines that the CH1 channel and the CH2 channel are in the idle state, the CH3 channel and the CH4 channel are occupied by Wi-Fi-A, and the CH5 channel is occupied by Wi-Fi-B.

Operation 3: The base station determines, based on the state information of the channel, a bandwidth used for sending downlink data of a current subframe.

In an embodiment, because the CH1 channel and the CH2 channel are in the idle state, the base station carries the downlink data of the service in the current subframe through the CH1 channel and the CH2 channel, that is, a channel bandwidth used by the current subframe is 40 MHz.

Operation 4: After the downlink data of the current subframe is sent, the base station switches a status of a transmitter to a receiving status to receive uplink data.

Operation 5: The base station determines whether to perform channel listening on a channel occupied by the service. If the base station performs channel listening, operation 6 is performed; or if the base station does not perform channel listening, operation 8 is performed.

Operation 6: When receiving the uplink data, the base station performs channel listening on a channel that is not occupied by the service, to determine state information of the channel that is not occupied by the service.

In an embodiment, as shown in FIG. 8, in an uplink part of the subframe 1, the CH3, the CH4, and the CH5 channels are still not occupied by the service. However, services of Wi-Fi-A on the CH3 channel and the CH4 channel have been completed, and the CH3 channel and the CH4 channel have been released and are not temporarily occupied by other services. Therefore, the state information detected by the base station indicates the idle state. However, a service of Wi-Fi-B on the CH5 channel has not been completed. Therefore, the state information detected by the base station indicates the busy state.

It should be understood that if the base station does not complete listening on a channel, regardless of whether the channel is in the idle state, the channel cannot be used when the base station sends data of a next subframe.

Operation 7: After receiving the uplink data, the base station demodulates and decodes the uplink data.

Operation 8: The base station determines whether a channel occupancy time for transmission of the service is ended. If the channel occupancy time is ended, the transmission of the service is ended; or if the channel occupancy time is not ended, the base station performs transmission of the service in a next subframe again from operation 3.

When the base station determines that the CH3 channel and the CH4 channel in the next subframe are in the idle state, the base station may adjust a channel bandwidth used for downlink data transmission of the service in the next subframe to 80 MHz. As shown in FIG. 8, in a subframe 2, channels used by the service include the CH1 channel to the CH4 channel.

It should be understood that the base station may determine, based on a requirement, whether to perform channel listening. As shown in FIG. 8, in the subframe 2, a service of Wi-Fi-B on the CH5 channel has not been completed, and only the CH5 channel in the channel system is not occupied by the service. In this case, the base station may determine not to perform listening on the CH5. However, in a subframe 3, the service of Wi-Fi-B on the CH5 channel has been completed, and the CH5 channel is released. In this case, the base station may determine to perform listening on the CH5, and then adjust the channel bandwidth of the service in a subframe 4.

Figure 9:
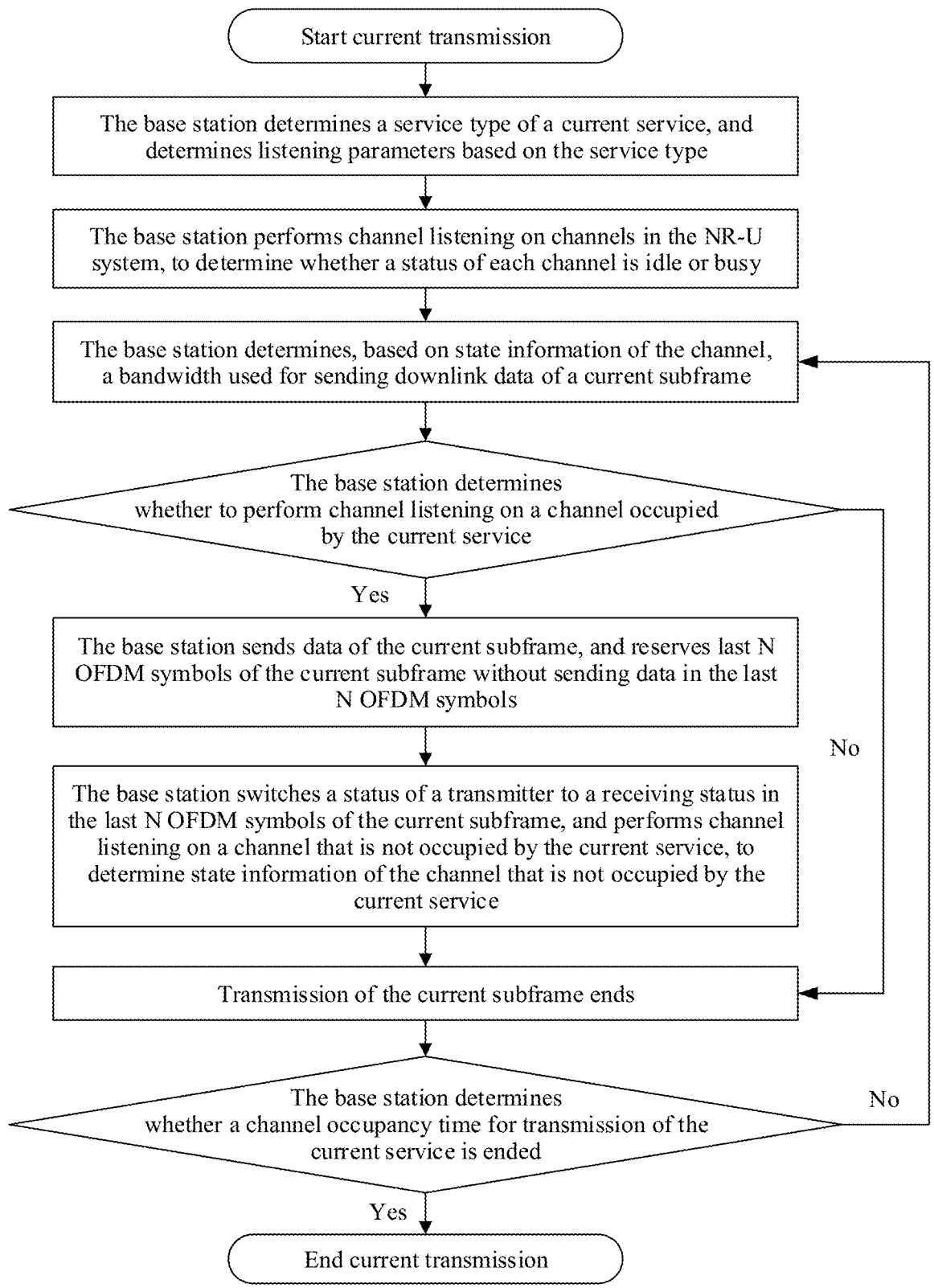
FIG. 9 is a schematic flowchart of data transmission in a scenario in which a data frame structure is a non-self-contained subframe according to an embodiment of this application.

As shown in FIG. 9, based on an implementation method of a non-self-contained subframe structure, a specific procedure of the method is as follows:

Operation 1: When a service is in a channel contention phase, the base station first determines a service type of the service, and determines listening parameters based on the service type, for example, a quantity of backoff subframes, a channel occupancy time, and a current transmission bandwidth.

It should be understood that the listening parameters may be determined by the base station based on the service or according to a stipulation in a protocol. For example, the channel occupancy time may be determined based on a service priority of the service; and the transmission bandwidth of the service may be determined based on an actual traffic volume of the service.

In an embodiment, in an example, the base station performs channel listening in a short listening manner. It is assumed that the base station selects sending duration of a last OFDM symbol in each subframe of a data frame as the listening duration, and the sending duration of the last OFDM symbol is 71 microseconds. In this case, the base station may determine that the listening duration of short listening is 25 microseconds. That is, the base station may perform listening on each of the five channels CH1 to CH5 for 25 microseconds.

In another example, if the base station performs channel listening in a long listening manner, the base station may determine, based on a status of a data frame of a service, duration of a listening slot for long listening and a quantity of backoff subframes. It is assumed that the base station selects sending duration of a last OFDM symbol in each subframe of a data frame as the listening duration, and the sending duration of the last OFDM symbol is 71 microseconds. In this case, the base station may determine that the fixed listening duration of long listening is 25 microseconds. The quantity of backoff subframes is randomly generated by the base station. For example, there may be 5, 5, 4, 3, and 10 backoff subframes respectively of the channels CH1 to CH5.

Operation 2: The base station performs channel listening on channels in the NR-U system, to determine whether a status of each channel is idle or busy.

The base station performs listening on the channels in the NR-U system based on the listening parameters determined in operation 1, to determine state information of the five channels. It should be understood that the state information of the channel includes indication of the idle state and the busy state. If the channel is released by a previous service and is currently not occupied by any service, the state information of the channel indicates the idle state; or if the channel is being occupied by a service, the state information of the channel indicates the busy state.

Figure 10:
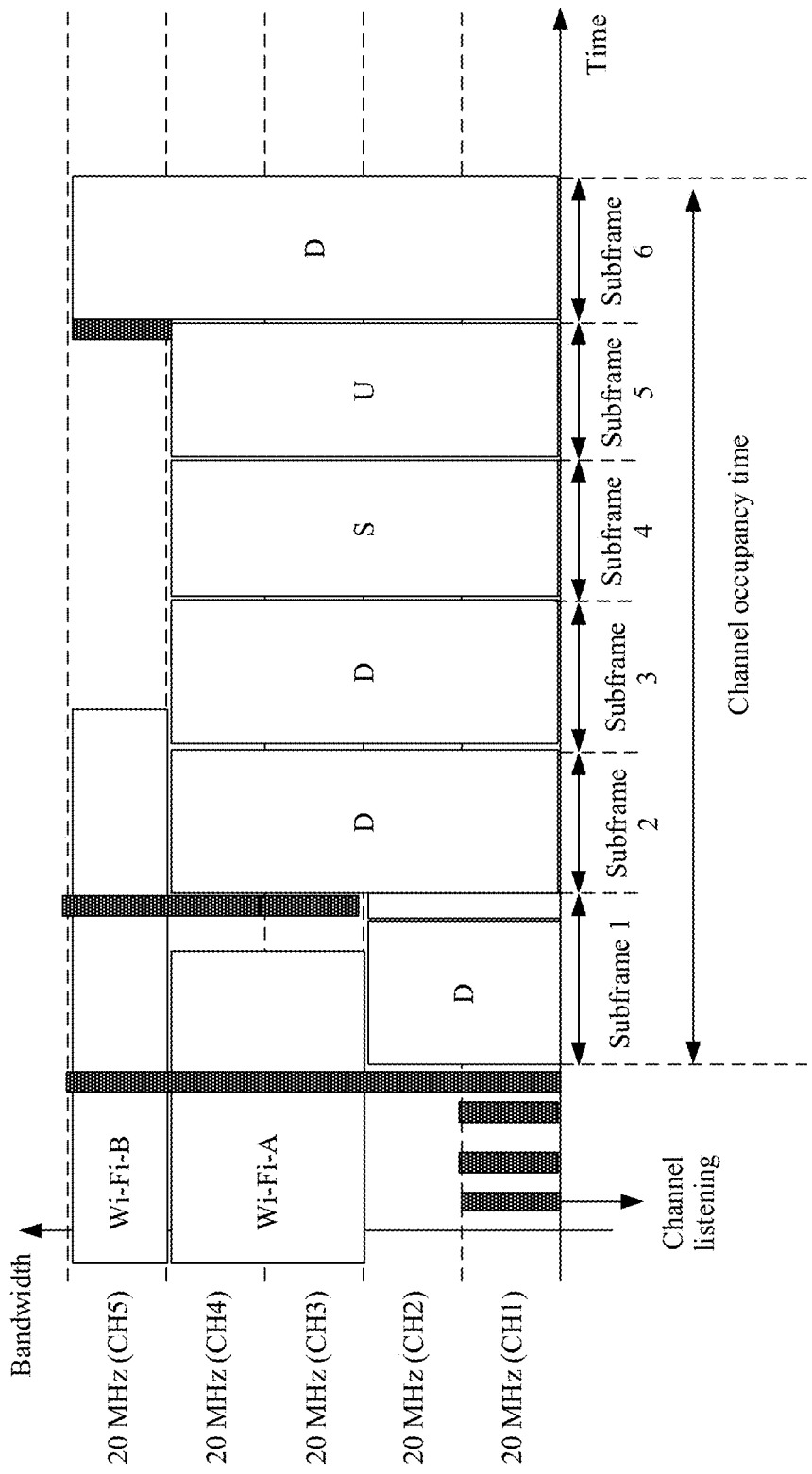
FIG. 10 is a schematic diagram of a channel listening process in which a data frame structure is a non-self-contained subframe according to an embodiment of this application.

It can be learned from the foregoing description that, if the base station uses short listening, the base station determines the state information of the five channels after performing listening on each channel for 25 microseconds. If the base station uses long listening, after performing fixed-duration listening on each channel for 25 microseconds, if the state information of the channel indicates the idle state, the base station performs short listening on the channel again based on the quantity of backoff subframes of each channel, or if the state information of the channel in the backoff subframe still indicates the idle state, the base station determines that the channel is in the idle state, and sends a signal to access the channel. As shown in FIG. 10, before accessing the channel in the subframe 1, the base station performs listening on the CH1 channel to the CH5 channel, and determines that the CH1 channel and the CH2 channel are in the idle state, the CH3 channel and the CH4 channel are occupied by Wi-Fi-A, and the CH5 channel is occupied by Wi-Fi-B.

Operation 3: The base station determines, based on the state information of the channel, a bandwidth used for sending downlink data of a current subframe.

In an embodiment, if the CH1 channel and the CH2 channel are in the idle state, the base station carries the downlink data of the service in the current subframe through the CH1 channel and the CH2 channel, that is, a channel bandwidth used by the current subframe is 40 MHz.

Operation 4: The base station determines whether to perform channel listening on a channel occupied by the service. If the base station performs channel listening, operation 5 is performed; or if the base station does not perform channel listening, operation 6 is performed.

Operation 5: The base station starts to send data of the service in the current subframe, and reserves last N OFDM symbols of the current subframe without sending data in the last N OFDM symbols.

Operation 6: The base station switches a status of a transmitter to a receiving status in the last N OFDM symbols of the current subframe, and performs channel listening on a channel that is not occupied by the service, to determine state information of the channel that is not occupied by the service.

In an embodiment, as shown in FIG. 10, in a sending period of a last OFDM symbol in the subframe 1 (no data is sent in the OFDM symbol), the CH3, the CH4, and the CH5 channels are still not occupied by the service. However, services of Wi-Fi-A on the CH3 channel and the CH4 channel have been completed, and the CH3 channel and the CH4 channel have been released and are not temporarily occupied by other services. Therefore, the state information detected by the base station indicates the idle state. However, a service of Wi-Fi-B on the CH5 channel has not been completed. Therefore, the state information detected by the base station indicates the busy state.

It should be understood that if the base station does not complete listening on a channel, regardless of whether the channel is in the idle state, the channel cannot be used when the base station sends data of a next subframe.

Operation 7: The base station determines whether a channel occupancy time for transmission of the service is ended. If the channel occupancy time is ended, the transmission of the service is ended; or if the channel occupancy time is not ended, the base station performs transmission of the service in a next subframe again from operation 3.

When the base station determines that the CH3 channel and the CH4 channel in the next subframe are in the idle state, the base station may adjust a channel bandwidth used for downlink data transmission of the service in the next subframe to 80 MHz. As shown in FIG. 10, in the subframe 2, channels used by the service include the CH1 channel to the CH4 channel.

It should be understood that the base station may determine, based on a requirement, whether to perform channel listening. As shown in FIG. 10, in the subframe 2 and the subframe 3, a service of Wi-Fi-B on the CH5 channel has not been completed, and only the CH5 channel in the channel system is not occupied by the service. In this case, the base station may determine not to perform listening on the CH5. However, in a subframe 5, the service of Wi-Fi-B on the CH5 channel has been completed, and the CH5 channel is released. In this case, the base station may determine to perform listening on the CH5, and then adjust the channel bandwidth of the service in a subframe 6.

It may be understood that, when the non-self-contained subframe includes a plurality of downlink-uplink grant points or has a frame structure similar to a "downlink-uplink-downlink" structure, the base station may also perform channel listening on an uplink part by using the method shown in FIG. 7.

Figure 11:
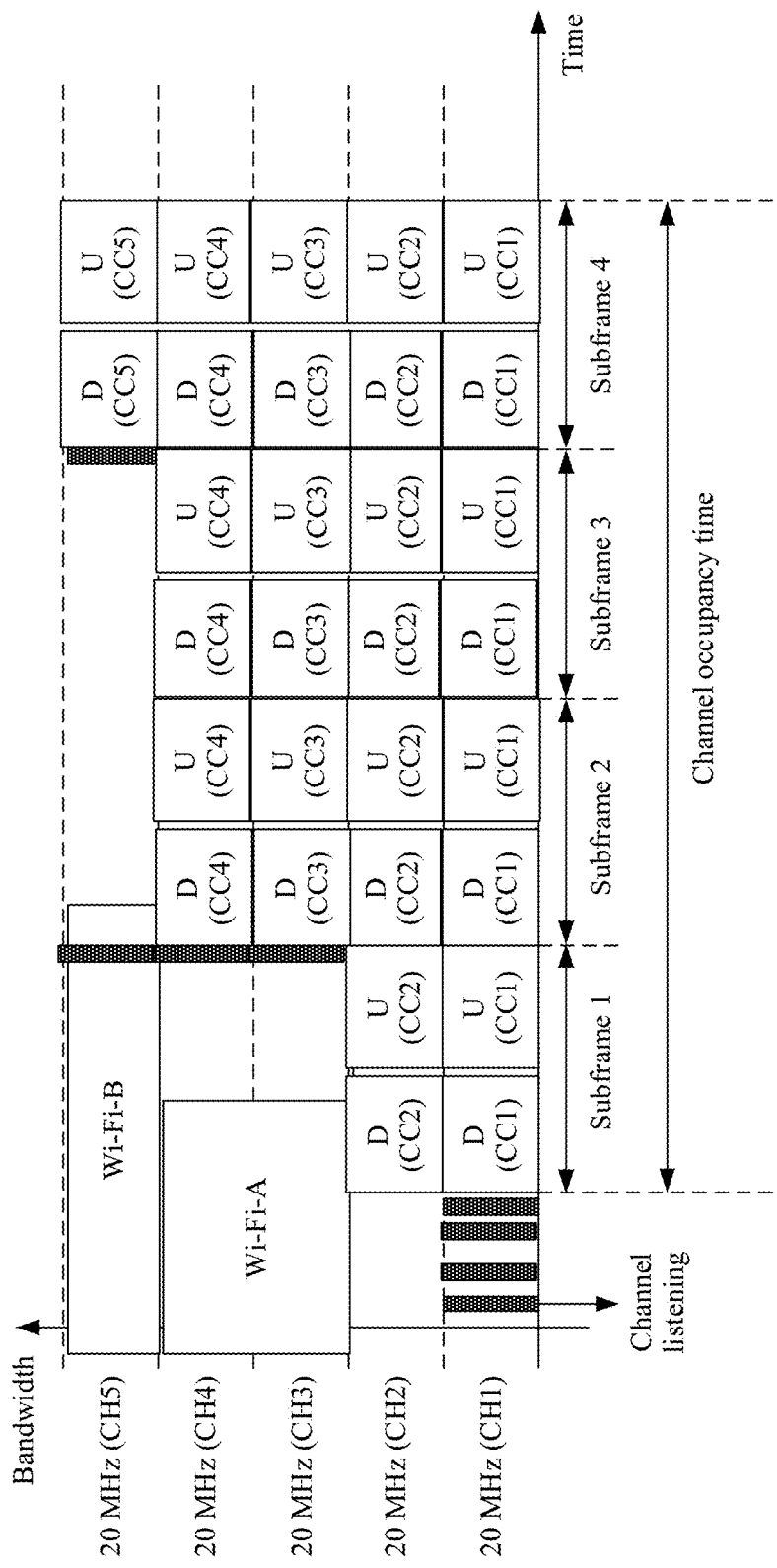
FIG. 11 is a schematic diagram of a channel listening process in intra-band carrier aggregation according to an embodiment of this application.

It should be understood that when the NR system is applied to a scenario in which a carrier aggregation technology is used, corresponding channel listening may be performed by performing operations shown in FIG. 7 and FIG. 9 for inter-band carrier aggregation. A specific implementation is determined based on a data frame structure of the service. Specifically, as shown in FIG. 11, the data frame structure of the service in the inter-band carrier aggregation is a self-contained subframe. Before accessing the channel in the subframe 1, the base station performs listening on the CH1 channel to the CH5 channel, and determines that the CH1 channel and the CH2 channel are in the idle state, the CH3 channel and the CH4 channel are occupied by Wi-Fi-A, and the CH5 channel is occupied by Wi-Fi-B. In an uplink part of the subframe 1, the CH3, the CH4, and the CH5 channels are still not occupied by the service. However, services of Wi-Fi-A on the CH3 channel and the CH4 channel have been completed, and the CH3 channel and the CH4 channel have been released and are not temporarily occupied by other services. Therefore, the state information detected by the base station indicates the idle state. However, a service of Wi-Fi-B on the CH5 channel has not been completed. Therefore, the state information detected by the base station indicates the busy state. In the subframe 2, channels used by the service include the CH1 channel to the CH4 channel. In the subframe 2, a service of Wi-Fi-B on the CH5 channel has not been completed, and only the CH5 channel in the channel system is not occupied by the service. In this case, the base station may determine not to perform listening on the CH5. However, in the subframe 3, the service of Wi-Fi-B on the CH5 channel has been completed, and the CH5 channel is released. In this case, the base station may determine to perform listening on the CH5, and then adjust the channel bandwidth of the service in the subframe 4.

It should be understood that, in the carrier aggregation scenario, after the service accesses an idle channel, the base station activates a corresponding CC to perform DL scheduling and UL scheduling.

Figure 12:
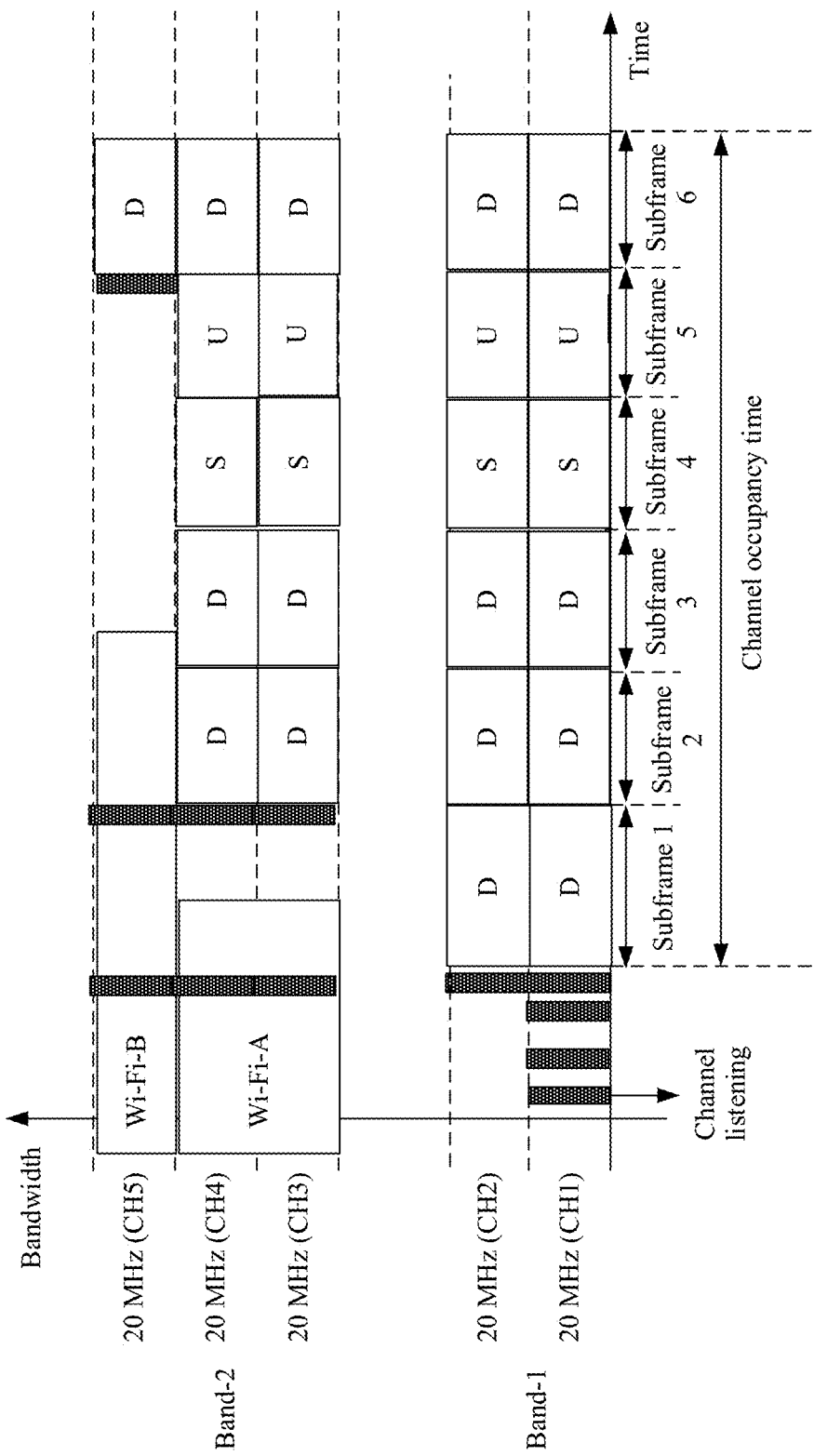
FIG. 12 is a schematic diagram of a channel listening process in inter-band carrier aggregation according to an embodiment of this application.

In the intra-band carrier aggregation, because there is relatively small adjacent-channel interference, channel listening may be performed at any moment within the channel occupancy time of the service, or corresponding channel listening may be performed by performing operations shown in FIG. 7 and FIG. 9. A specific implementation is determined by a data frame structure of the service. In an embodiment, as shown in FIG. 12, before accessing the channel in the subframe 1, the base station performs listening on the CH1 channel to the CH5 channel, and determines that the CH1 channel and the CH2 channel are in the idle state, the CH3 channel and the CH4 channel are occupied by Wi-Fi-A, and the CH5 channel is occupied by Wi-Fi-B. In a sending period of a last OFDM symbol in the subframe 1 (data of the service is carried in the OFDM symbol), the CH3, the CH4, and the CH5 channels are still not occupied by the service. However, services of Wi-Fi-A on the CH3 channel and the CH4 channel have been completed, and the CH3 channel and the CH4 channel have been released and are not temporarily occupied by other services. Therefore, the state information detected by the base station indicates the idle state. However, a service of Wi-Fi-B on the CH5 channel has not been completed. Therefore, the state information detected by the base station indicates the busy state. Therefore, in the subframe 2, channels used by the service include the CH1 channel to the CH4 channel. In the subframe 2 and the subframe 3, a service of Wi-Fi-B on the CH5 channel has not been completed, and only the CH5 channel in the channel system is not occupied by the service. In this case, the base station may determine not to perform listening on the CH5. However, in the subframe 5, the service of Wi-Fi-B on the CH5 channel has been completed, and the CH5 channel is released. In this case, the base station may determine to perform listening on the CH5, and then adjust the channel bandwidth of the service in the subframe 6.

The foregoing describes the data transmission method in the embodiments of this application, and the following describes a network device and a terminal in the embodiments of this application.

Figure 13:
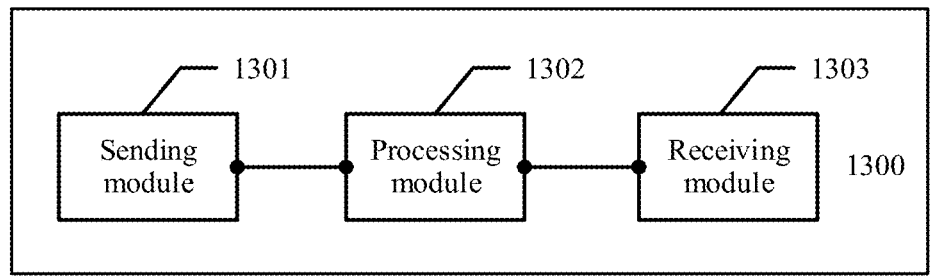
FIG. 13 is a schematic diagram of an embodiment of a network device according to an embodiment of this application.

In an embodiment, referring to FIG. 13, the communications apparatus 1300 in this embodiment of this application includes a sending module 1301 and a processing module 1302. The apparatus 1300 may be the network device in the foregoing method embodiment, or may be one or more chips in the network device. The apparatus 1300 may be configured to perform some or all functions of the network device in the foregoing method embodiment.

For example, the processing module 1302 may be configured to perform operation 602 in the foregoing method embodiment. For example, the processing module 1301 performs channel listening on a channel that is not occupied in the channel system by the service. The sending module 1301 may be configured to perform operation 601 and operation 603 in the foregoing method embodiment.

In an embodiment, the apparatus 1300 may further include a receiving module 1303. For example, the receiving module 1303 is configured to receive uplink data returned by a terminal.

In an embodiment, the apparatus 1300 further includes a storage module. The storage module is coupled to the processing module, so that the processing module can execute a computer-executable instruction stored in the storage module, to implement a function of the base station in the foregoing method embodiment. In an example, the storage module optionally included in the apparatus 1300 may be a storage unit in a chip, for example, a register or a buffer. Alternatively, the storage module may be a storage unit located outside the chip, for example, a read-only memory (read-only memory, ROM for short), another type of static storage device that can store static information and an instruction, a random access memory (RAM for short), or the like. It should be understood that a procedure performed between modules of the network device in the corresponding embodiment in FIG. 13 is similar to the procedure performed by the base station or the network device in the corresponding method embodiment in FIG. 6. Details are not described herein again.

Figure 14:
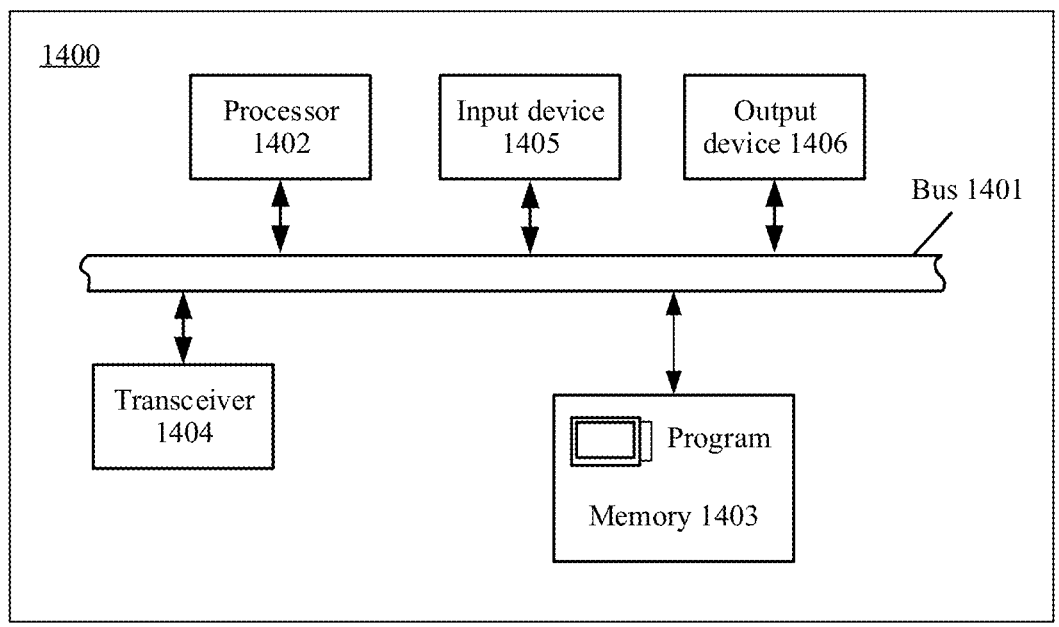
FIG. 14 is a schematic diagram of another embodiment of a network device according to an embodiment of this application.

FIG. 14 is a possible schematic structural diagram of a communications apparatus 1400 according to the foregoing embodiment. The apparatus 1400 may be configured as the foregoing base station. The apparatus 1400 may include a processor 1402, a computer-readable storage medium/memory 1403, a transceiver 1404, an input device 1405, an output device 1406, and a bus 1401. The processor, the transceiver, the computer-readable storage medium, and the like are connected through the bus. A specific connection medium between the foregoing components is not limited in this embodiment of this application.

In an example, the processor 1402 performs channel listening on a channel that is not occupied in the channel system by the service.

The transceiver 1404 sends first data to a terminal in a first subframe through a first channel, where the first channel is a channel occupied in a channel system by a service between the network device and the terminal; and when there is a second channel in an idle state, the network device sends second data of the service to the terminal in a second subframe through the first channel and the second channel, where the second subframe is after the first subframe.

The service includes the first data and the second data, and a data frame of the service includes the first subframe and the second subframe.

In an example, the processor 1402 may include a baseband circuit. For example, when a relationship between a traffic volume of the service and a channel bandwidth meets a preset condition, channel listening may be performed on a channel that is not occupied in the channel system by the service. The transceiver 1404 may include a radio frequency circuit, to perform processing such as modulation and amplification on the first data or the second data, and then send the processed first data or second data to the terminal.

In another example, the processor 1402 may run an operating system to control a function between each device and each component. The transceiver 1404 may include a baseband circuit and a radio frequency circuit. For example, the first data or the second data may be processed by the baseband circuit and the radio frequency circuit, and then the processed first data or second data is sent to the terminal.

The transceiver 1404 and the processor 1402 may implement corresponding operations in FIG. 6. Details are not described herein again.

It may be understood that FIG. 14 shows only a simplified design of the network device. In actual application, the network device may include any quantity of transceivers, processors, memories, and the like, and all network devices that can implement this application fall within the protection scope of this application.

The processor 1402 in the apparatus 1400 may be a general-purpose processor, for example, a general-purpose central processing unit (CPU), a network processor (NP), a microprocessor, an application-specific integrated circuit (ASIC), or one or more integrated circuits configured to control program execution in the solutions of this application. The processor 1402 may alternatively be a digital signal processor (DSP), a field-programmable gate array (field-programmable gate array, FPGA), another programmable logic device, a discrete gate or a transistor logic device, or a discrete hardware component. The controller/processor may alternatively be a combination of processors implementing a computing function, for example, a combination of one or more microprocessors, or a combination of a DSP and a microprocessor. The processor usually performs a logic and arithmetic operation based on a program instruction stored in the memory.

The bus 1401 mentioned above may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 14, but this does not mean that there is only one bus or only one type of bus.

The computer-readable storage medium/memory 1403 may further store an operating system and another application program. Specifically, the program may include program code, and the program code includes a computer operation instruction. More specifically, the memory may be a read-only memory (ROM), another type of static storage device that can store static information and an instruction, a random access memory (RAM), another type of dynamic storage device that can store information and an instruction, a magnetic disk storage, or the like. The memory 1403 may be a combination of the memories. In addition, the foregoing computer-readable storage medium/memory may be in the processor, or may be distributed outside the processor, or distributed on a plurality of entities including the processor or a processing circuit. The foregoing computer-readable storage medium/memory may be specifically embodied in a computer program product. For example, the computer program product may include a computer-readable medium in a packaging material.

Alternatively, an embodiment of this application further provides a general-purpose processing system. For example, the general-purpose processing system is usually referred to as a chip. The general-purpose processing system includes one or more microprocessors that provide a processor function, and an external memory that provides at least a part of the storage medium. All these components are connected to other supporting circuits via an external bus architecture. When the instruction stored in the memory is executed by the processor, the processor is enabled to perform some or all of the operations by the network device in the data transmission method in the embodiment shown in FIG. 6, for example, operation 602 in FIG. 6 and/or another process used for the technology described in this application.

Methods or algorithm operations described in combination with the content disclosed in this application may be implemented by hardware, or may be implemented by a processor by executing a software instruction. A software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in user equipment. Certainly, the processor and the storage medium may exist in user equipment as discrete components.

In the embodiments, the network device performs, within a channel occupancy time of the service, channel listening on the channel that is not occupied by the service, and when there is a channel in the idle state in channels that are not occupied by the service, the channel in the idle state is used for transmitting the data of the service. In other words, the channel in the idle state may be used for data transmission in a timely manner, so that channel resource utilization can be effectively improved.

Figure 15:
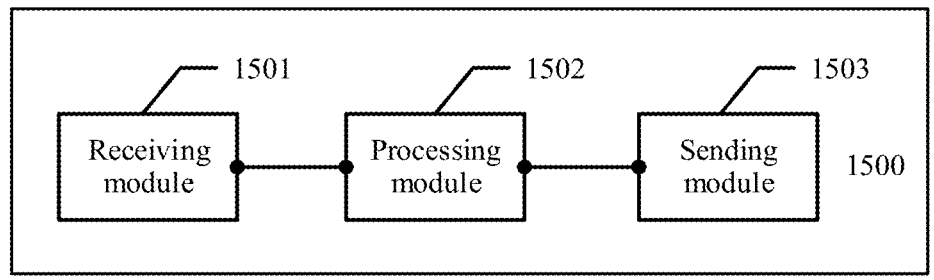
FIG. 15 is a schematic diagram of a terminal according to an embodiment of this application.

In an embodiment, referring to FIG. 15, the communications apparatus 1500 in this embodiment of this application includes a receiving module 1501 and a processing module 1502. The apparatus 1500 may be the terminal in the foregoing method embodiment, or may be one or more chips in the terminal. The apparatus 1500 may be configured to perform some or all functions of the terminal in the foregoing method embodiment.

For example, the receiving module 1501 may be configured to perform operation 601 and operation 603 in the foregoing method embodiment.

In an embodiment, the apparatus 1500 may further include a sending module 1503. For example, the sending module 1503 is configured to send uplink data to a network device.

In an embodiment, the apparatus 1500 further includes a storage module. The storage module is coupled to the processing module, so that the processing module can execute a computer-executable instruction stored in the storage module, to implement a function of the terminal in the foregoing method embodiment. In an example, the storage module optionally included in the apparatus 1500 may be a storage unit in a chip, for example, a register or a buffer. Alternatively, the storage module may be a storage unit located outside the chip, for example, a read-only memory (ROM for short), another type of static storage device that can store static information and an instruction, a random access memory (RAM for short), or the like. It should be understood that a procedure performed between modules of the terminal in the corresponding embodiment in FIG. 15 is similar to the procedure performed by the terminal in the corresponding method embodiment in FIG. 6. Details are not described herein again.

Figure 16:
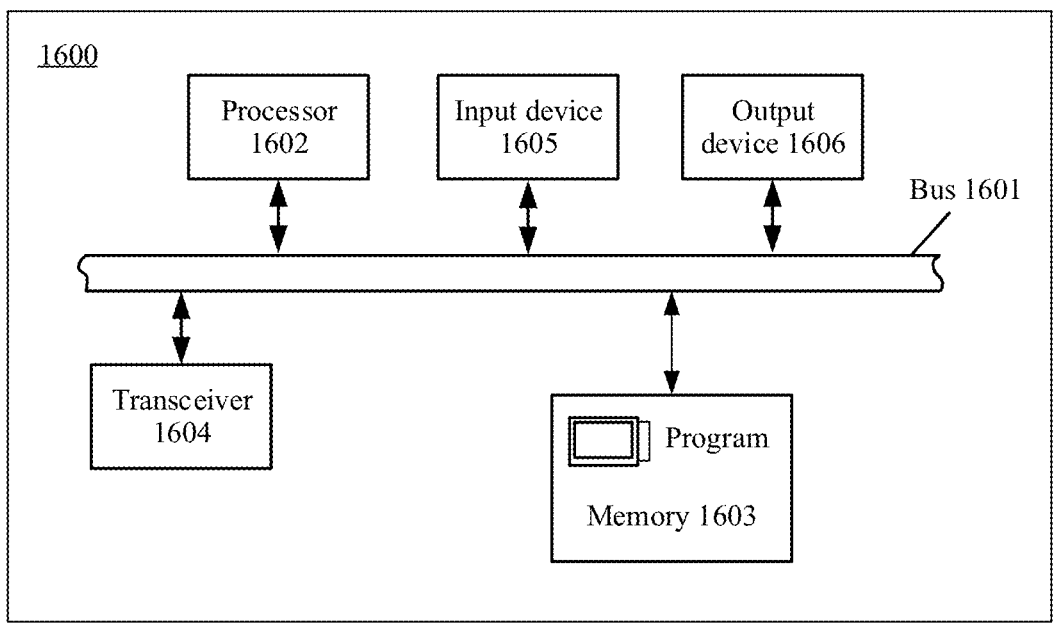
FIG. 16 is a schematic diagram of another embodiment of a terminal according to an embodiment of this application.

FIG. 16 is a possible schematic structural diagram of an apparatus 1600 according to the foregoing embodiment. The apparatus 1600 may be configured as the foregoing terminal. The apparatus 1600 may include a processor 1602, a computer-readable storage medium/memory 1603, a transceiver 1604, an input device 1605, an output device 1606, and a bus 1601. The processor, the transceiver, the computer-readable storage medium, and the like are connected through the bus. A specific connection medium between the foregoing components is not limited in this embodiment of this application.

In an example, the transceiver 1604 receives first data sent by the network device in a first subframe through a first channel, where the first channel is a channel occupied in a channel system by a service between the network device and the terminal; then the transceiver 1604 receives second data sent by the network device in a second subframe through the first channel and the second channel, where the second channel is a channel that is in an idle state and that is obtained by the network device by performing channel listening on a channel that is not occupied in the channel system by the service. The service includes the first data and the second data, and a data frame of the service includes the first subframe and the second subframe.

In an example, the processor 1602 may include a baseband circuit. For example, the baseband circuit may generate uplink data. The transceiver 1604 may include a radio frequency circuit, to perform processing such as modulation and amplification on the uplink data, and then send the processed uplink data to the network device.

In another example, the processor 1602 may run an operating system to control a function between each device and each component. The transceiver 1604 may include a baseband circuit and a radio frequency circuit. For example, the uplink data may be processed by the baseband circuit and the radio frequency circuit, and then the processed uplink data is sent to the network device.

The transceiver 1604 and the processor 1602 may implement corresponding operations in FIG. 6. Details are not described herein again.

It may be understood that FIG. 16 shows only a simplified design of the terminal. In actual application, the terminal may include any quantity of transceivers, processors, memories, and the like, and all terminals that can implement this application fall within the protection scope of this application.

The processor 1602 in the apparatus 1600 may be a general-purpose processor, for example, a general-purpose central processing unit (CPU), a network processor (network processor, NP), a microprocessor, an application-specific integrated circuit (application-specific integrated circuit, ASIC), or one or more integrated circuits configured to control program execution in the solutions of this application. The processor 1602 may alternatively be a digital signal processor (DSP), a field-programmable gate array (FPGA), another programmable logic device, a discrete gate or a transistor logic device, or a discrete hardware component. The controller/processor may alternatively be a combination of processors implementing a computing function, for example, a combination of one or more microprocessors, or a combination of a DSP and a microprocessor. The processor usually performs a logic and arithmetic operation based on a program instruction stored in the memory.

The bus 1601 mentioned above may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 16, but this does not mean that there is only one bus or only one type of bus.

The computer-readable storage medium/memory 1603 may further store an operating system and another application program. Specifically, the program may include program code, and the program code includes a computer operation instruction. More specifically, the memory may be a read-only memory (ROM), another type of static storage device that can store static information and an instruction, a random access memory (RAM), another type of dynamic storage device that can store information and an instruction, a magnetic disk storage, or the like. The memory 1603 may be a combination of the memories. In addition, the foregoing computer-readable storage medium/memory may be in the processor, or may be distributed outside the processor, or distributed on a plurality of entities including the processor or a processing circuit. The foregoing computer-readable storage medium/memory may be specifically embodied in a computer program product. For example, the computer program product may include a computer-readable medium in a packaging material.

Alternatively, an embodiment of this application further provides a general-purpose processing system. For example, the general-purpose processing system is usually referred to as a chip. The general-purpose processing system includes one or more microprocessors that provide a processor function, and an external memory that provides at least a part of the storage medium. All these components are connected to other supporting circuits via an external bus architecture. When the instruction stored in the memory is executed by the processor, the processor is enabled to perform some or all of the operations by the terminal in the data transmission method in the embodiment shown in FIG. 6, for example, operation 601 and operation 603 in FIG. 6 and/or another process used for the technology described in this application.

Methods or algorithm operations described in combination with the content disclosed in this application may be implemented by hardware, or may be implemented by a processor by executing a software instruction. A software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to the processor, so that the processor can read information from the storage medium and write information into the storage medium. Certainly, the storage medium may be a component of the processor. The processor and the storage medium may be located in an ASIC. In addition, the ASIC may be located in user equipment. Certainly, the processor and the storage medium may exist in user equipment as discrete components.

In the embodiments, the network device performs, within a channel occupancy time of the service, channel listening on the channel that is not occupied by the service, and when there is a channel in the idle state in the channels that are not occupied by the service, the channel in the idle state is used for transmitting the data of the service. In other words, the channel in the idle state may be used for data transmission in a timely manner, so that channel resource utilization can be effectively improved.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods in the embodiments of this application. The storage medium includes any medium that can store program code, such as a USB flash drive, a removable hard disk, a read-only memory (ROM), a random access memory (RAM), a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method, comprising:
    sending, by a network device, first data to a terminal in a first subframe through a first channel that is occupied in a channel system by a service between the network device and the terminal;
    performing, by the network device, channel listening on a channel that is not occupied in the channel system by the service; and
    in response to determining a second channel in an idle state, sending, by the network device, second data of the service to the terminal in a second subframe through the first channel and the second channel, wherein the second subframe is transmitted after the first subframe,
    wherein the service comprises the first data and the second data, and a data frame of the service comprises the first subframe and the second subframe.

2. The method according to claim 1, wherein the first subframe is a self-contained subframe; and the performing channel listening on a channel that is not occupied in the channel system by the service comprises:
    performing, by the network device in a time period corresponding to an uplink symbol in the first subframe, channel listening on the channel that is not occupied in the channel system by the service.

3. The method according to claim 1, wherein the first subframe is a downlink subframe; and the performing channel listening on a channel that is not occupied in the channel system by the service comprises:
    performing, by the network device in a time period corresponding to N downlink symbols in the first subframe, listening on the channel that is not occupied in the channel system by the service, wherein N is a positive integer, and the N downlink symbols do not carry data.

4. The method according to claim 1, wherein the data frame of the service further comprises a third subframe and a fourth subframe that is adjacent to and after the third subframe, the third subframe is an uplink subframe and the fourth subframe is a downlink subframe, the third subframe is after the second subframe, and the service further comprises third data; and
    wherein the method further comprises:
        performing, by the network device in a time period corresponding to the third subframe, channel listening on the channel that is not occupied in the channel system by the service; and in response to determining a third channel in the idle state, sending, by the network device, the third data to the terminal in the fourth subframe through the first channel, the second channel, and the third channel.

5. The method according to claim 1, wherein when the channel system applies inter-band carrier aggregation, the performing channel listening on a channel that is not occupied in the channel system by the service comprises:
performing, by the network device in any time period before the second subframe, listening on the channel that is not occupied in the channel system by the service, wherein a channel occupancy time is a time period in which data transmission is allowed when the service accesses the channel system.

6. The method according to claim 1, further comprising:
sending, by the network device, a downlink control message to the terminal, wherein the downlink control message carries uplink scheduling information and indication information that is used to indicate a transmission bandwidth of the service.

7. The method according to claim 1, further comprising:
processing, by the network device, the first data based on a minimum bandwidth granularity of the channel system corresponding to the first subframe; and
processing, by the network device, the second data based on the minimum bandwidth granularity of the channel system corresponding to the second subframe.

8. The method according to claim 1, wherein the performing channel listening on a channel that is not occupied in the channel system by the service comprises:
when a relationship between a traffic volume of the service and a channel bandwidth meets a preset condition, performing, by the network device, channel listening on the channel that is not occupied in the channel system by the service.

9. A data transmission method, comprising:
receiving, by a terminal, first data from a communications apparatus in a first subframe through a first channel that is occupied in a channel system by a service between the communications apparatus and the terminal;
receiving, by the terminal, second data from the communications apparatus in a second subframe through the first channel and a second channel that is in an idle state and obtained by the communications apparatus by performing channel listening on a channel that is not occupied in the channel system by the service,
wherein the service comprises the first data and the second data, and a data frame of the service comprises the first subframe and the second subframe.

10. The method according to claim 9, wherein the first subframe is a self-contained subframe, and the channel listening is performed on a channel that is not occupied in the channel system by the service in a time period corresponding to an uplink symbol of the first subframe.

11. The method according to claim 9, wherein the first subframe is a downlink subframe, and the channel listening is performed on a channel that is not occupied in the channel system by the service in a time period corresponding to N downlink symbols in the first subframe, wherein N is a positive integer, and the N downlink symbols do not carry data.

12. The method according to claim 9, wherein the data frame of the service further comprises a third subframe and a fourth subframe that is adjacent to and after the third subframe, the third subframe is an uplink subframe, the fourth subframe is a downlink subframe, the third subframe is after the second subframe, and the service further comprises third data; and
wherein the method further comprises:
receiving, by the terminal, the third data from the communications apparatus in the fourth subframe through the first channel, the second channel, and a third channel, wherein the third channel is a channel that is in the idle state after the channel listening is performed on the channel that is not occupied in the channel system by the service; and the channel listening is performed on a channel that is not occupied in the channel system by the service in a time period corresponding to the third subframe.

13. The method according to claim 9, wherein when the channel system applies inter-band carrier aggregation, the channel listening is performed on a channel that is not occupied in the channel system by the service in any time period before the second subframe.

14. The method according to claim 9, further comprising:
receiving, by the terminal, a downlink control message from the communications apparatus, wherein the downlink control message carries uplink scheduling information and indication information that is used to indicate a transmission bandwidth of the service.

15. The method according to claim 9, wherein the first data is processed by the communications apparatus based on a minimum bandwidth granularity of the channel system corresponding to the first subframe, and the second data is processed by the communications apparatus based on the minimum bandwidth granularity of the channel system corresponding to the second subframe.

16. The method according to claim 9, wherein the channel listening is performed on a channel that is not occupied in the channel system by the service when a relationship between a traffic volume of the service and a channel bandwidth meets a preset condition.

17. A terminal, comprising:
a processor; and
a memory storing instructions, which when executed by the processor, cause the terminal to perform operations, the operations comprising:
receiving first data from a communications apparatus in a first subframe through a first channel that is occupied in a channel system by a service between the communications apparatus and the terminal;
receiving second data from the communications apparatus in a second subframe through the first channel and a second channel that is in an idle state and obtained by the communications apparatus by performing channel listening on a channel that is not occupied in the channel system by the service,
wherein the service comprises the first data and the second data, and a data frame of the service comprises the first subframe and the second subframe.

18. The terminal according to claim 17, wherein the first subframe is a self-contained subframe, and the channel listening is performed on a channel that is not occupied in the channel system by the service in a time period corresponding to an uplink symbol of the first subframe.

19. The terminal according to claim 17, wherein the first subframe is a downlink subframe, and the channel listening is performed on a channel that is not occupied in the channel system by the service in a time period corresponding to N downlink symbols in the first subframe, wherein N is a positive integer, and the N downlink symbols do not carry data.

20. The terminal according to claim 17, wherein the data frame of the service further comprises a third subframe and a fourth subframe that is adjacent to and after the third subframe, the third subframe is an uplink subframe, the fourth subframe is a downlink subframe, the third subframe is after the second subframe, and the service further comprises third data; and wherein the operations further comprise:
receiving the third data from the communications apparatus in the fourth subframe through the first channel, the second channel, and a third channel, wherein the third channel is a channel that is in the idle state after the channel listening is performed on the channel that is not occupied in the channel system by the service; and the channel listening is performed on a channel that is not occupied in the channel system by the service in a time period corresponding to the third subframe.

* * * * *